United States Patent
Batson et al.

(10) Patent No.: US 11,991,213 B2
(45) Date of Patent: *May 21, 2024

(54) SECURITY EVENTS GRAPH FOR ALERT PRIORITIZATION

(71) Applicant: Netskope, Inc., Santa Clara, CA (US)

(72) Inventors: Joshua David Batson, Sunnyvale, CA (US); Raymond Joseph Canzanese, Jr., Philadelphia, PA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,146

(22) Filed: Dec. 20, 2022

(65) Prior Publication Data

US 2023/0127836 A1    Apr. 27, 2023

Related U.S. Application Data

(63) Continuation of application No. 16/361,023, filed on Mar. 21, 2019, now Pat. No. 11,539,749.

(Continued)

(51) Int. Cl.
*H04L 9/40* (2022.01)
*G06F 16/901* (2019.01)
*G06F 16/906* (2019.01)

(52) U.S. Cl.
CPC .......... *H04L 63/20* (2013.01); *G06F 16/9024* (2019.01); *G06F 16/906* (2019.01)

(58) Field of Classification Search
CPC ..... H04L 63/20; G06F 16/906; G06F 16/9024
See application file for complete search history.

(56) References Cited

U.S. PATENT DOCUMENTS 7,624,448 B2    11/2009    Coffman
8,719,943 B2     5/2014    Noel et al.
(Continued)

OTHER PUBLICATIONS

Netskope, "Data Loss Prevention and Monitoring in the Cloud", Nov. 2014, 18 pages.

(Continued)

*Primary Examiner* — Meng Li
*Assistant Examiner* — Shu Chun Gao
(74) *Attorney, Agent, or Firm* — Haynes Beffel & Wolfeld LLP; Ernest J. Beffel, Jr.; Jason Liao

(57) ABSTRACT

The technology disclosed includes a system to group security alerts generated in a computer network and prioritize grouped security alerts for analysis, through graph-based clustering. The graph used to form clusters includes entities in the computer network represented as scored nodes, and relationships of entities as weighted edges. The technology disclosed includes traversing the graph starting at starting nodes and propagating native scores through and to neighboring nodes connected by the weighted edges. The propagated scores at visited nodes are normalized by attenuation based on contributing neighboring nodes of a respective visited node. An aggregate score for a visited node is calculated by accumulating propagated scores at visited nodes with their respective native scores. The technology disclosed forms clusters of connected nodes in the graph that have a respective aggregate score above a selected threshold. The clusters are ranked and prioritized for analysis, pursuant to the aggregate scores.

20 Claims, 17 Drawing Sheets

Related U.S. Application Data

(60) Provisional application No. 62/683,795, filed on Jun. 12, 2018.

(56) References Cited

U.S. PATENT DOCUMENTS

| | | |
|---|---|---|
| 8,813,234 B1 | 8/2014 | Bowers et al. |
| 9,560,069 B1* | 1/2017 | Agarwal ............... G06F 21/567 |
| 9,578,042 B2 | 2/2017 | Hu et al. |
| 9,609,011 B2 | 3/2017 | Muddu et al. |
| 10,341,373 B2 | 7/2019 | Bhatkar et al. |
| 10,409,995 B1 | 9/2019 | Wasiq et al. |
| 10,454,753 B2 | 10/2019 | Sasturkar et al. |
| 10,831,827 B2 | 11/2020 | Gifford et al. |
| 11,201,890 B1 | 12/2021 | Coull et al. |
| 2007/0209074 A1 | 9/2007 | Coffman |
| 2011/0035802 A1* | 2/2011 | Arajujo, Jr. ........... G06F 11/079 718/1 |
| 2012/0227108 A1 | 9/2012 | Noel et al. |
| 2014/0317736 A1 | 10/2014 | Cao et al. |
| 2015/0188941 A1 | 7/2015 | Boshmaf et al. |
| 2016/0205122 A1 | 7/2016 | Bassett |
| 2016/0210556 A1 | 7/2016 | Ben Simhon et al. |
| 2016/0261608 A1 | 9/2016 | Hu et al. |
| 2017/0063902 A1 | 3/2017 | Muddu et al. |
| 2017/0063910 A1 | 3/2017 | Muddu et al. |
| 2017/0199927 A1 | 7/2017 | Moore et al. |
| 2017/0222873 A1 | 8/2017 | Lee et al. |
| 2017/0286845 A1 | 10/2017 | Gifford et al. |
| 2017/0330096 A1* | 11/2017 | Das Gupta .......... G06F 11/3409 |
| 2018/0308026 A1 | 10/2018 | Sinha et al. |
| 2018/0351783 A1 | 12/2018 | Patrich et al. |
| 2018/0367548 A1 | 12/2018 | Stokes, III et al. |
| 2018/0375883 A1 | 12/2018 | Bhatkar et al. |
| 2019/0238564 A1 | 8/2019 | Rao et al. |
| 2019/0251251 A1* | 8/2019 | Carson ................... G06F 21/561 |
| 2019/0373005 A1* | 12/2019 | Bassett ................. G06F 21/577 |
| 2020/0358804 A1 | 11/2020 | Crabtree et al. |

OTHER PUBLICATIONS

"Repave the Cloud-Data Breach Collision Course," netSkope, Inc., 2014, 6 pgs.

Kent et al, Guide to Computer Security Log Management, National Institute of Standards and Technology (NIST), Special Publication No. SP 800-92, Sep. 2006, 64 pages.

A. C. Gilbert et al. Compressing Network Graphs. InLinkKDD, 2004, 10 pgs.

"The Netskope Advantage: Three "Must-Have" Requirements for Cloud Access Security Brokers", Jul. 2015, WP-12-2, 4 pages.

"The Netskope Active Platform Enabling Safe Migration to the Cloud", Apr. 2015, DS-1-8, Netskope, Inc., 6 pages.

"Netskope The 15 Critical CASB Use Cases", Netskope, Inc., EB-141-1, 19 pages.

"Cloud Data Loss Prevention Reference Architecture", Netskope, Sep. 2015, WP-88-1, 2 pages.

Liu et al. , "Isolation forest," Data Min. Know!. Discov., 2008, 10 pages.

J. Stokes et al, "On the number of star samples to find a vertex or edge with given degree in a graph," 2017 51st Annual Conference on Information Sciences and Systems (CISS), 2017, pp. 1-6.

Henderson et al., It's Who You Know—Graph Mining Using Recursive Structural Features,, KDD '11, Proceedings of the 17th ACM SIGKDD international conference on Knowledge discovery and data mining Aug. 2011 pp. 663-671.

Akoglu et al, "Graph based anomaly detection and description: a survey," Data Min. Know!. Discov., vol. 29, No. 3, pp. 626-688, 2014. (arXiv:1404.4679v2 [cs.SI] Apr. 28, 2014).

Akoglu, et al, "Oddball—Spotting Anomalies in Weighted Graphs," Lecture Notes in Computer Science, 2010, pp. 410-421.

Page et al., , "The PageRank citation ranking—Bringing order to the web, " Stanford Infolab, 1999.

* cited by examiner

SECURITY EVENTS GRAPH FOR ALERT PRIORITIZATION

PRIORITY DATA

This application is a continuation of U.S. Ser. No. 16/361,023, titled "Systems and Methods for Alert Prioritization Using Security Events Graph," filed 21 Mar. 2019, now U.S. Pat. No. 11,539,749, issued 27 Dec. 2022 which claims the benefit of U.S. Provisional Patent Application No. 62/683,795, entitled "Alert Prioritization Using Graph Algorithms", filed on 12 Jun. 2018. The priority applications are incorporated by reference as if fully set forth herein.

INCORPORATIONS

The following materials are incorporated by reference as if fully set forth herein:

U.S. Provisional Patent Application No. 62/683,789, entitled "System To Show Detailed Structure In A Moderately Sized Graph", filed on 12 Jun. 2018.

Contemporaneously filed U.S. patent application Ser. No. 16/361,039, entitled "Systems and Methods To Show Detailed Structure in a Security Events Graph," filed on 21 Mar. 2019, now U.S. Pat. No. 11,165,803, issued 2 Nov. 2021.

FIELD OF THE TECHNOLOGY DISCLOSED

The technology disclosed relates to graph presentation for prioritization of security incidents.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Security analysts use log data generated by security and operations systems to identify and protect enterprise networks against cybersecurity threats. Gigabytes of log security and operations log data can be generated in a short time. These logs contain security events with varying levels of threat. Firstly, it is difficult for an analyst to go through these logs and identify the alerts that need immediate attention. Secondly, it is difficult to identify different computer network entities related to a particular alert. Graphs can be used to visualize computer network entities which are connected to other entities through edges. However for a typical enterprise network, graphs can become very large with hundreds of thousands of entities connected through tens of millions edges. Security analysts are overwhelmed by such graphs of security events and they can miss most important alerts and entities related to those alerts. Some of these alerts are false positives. In most cases, a well-planned cyberattack impacts more than one entity in the enterprise network. It is difficult for security analysts to review the graph and identify groups of entities impacted by one or more alerts in the logs.

Therefore, an opportunity arises to automatically identify groups of entities in an enterprise network that are impacted by one or more alerts in the logs of data generated by security systems in a computer network.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
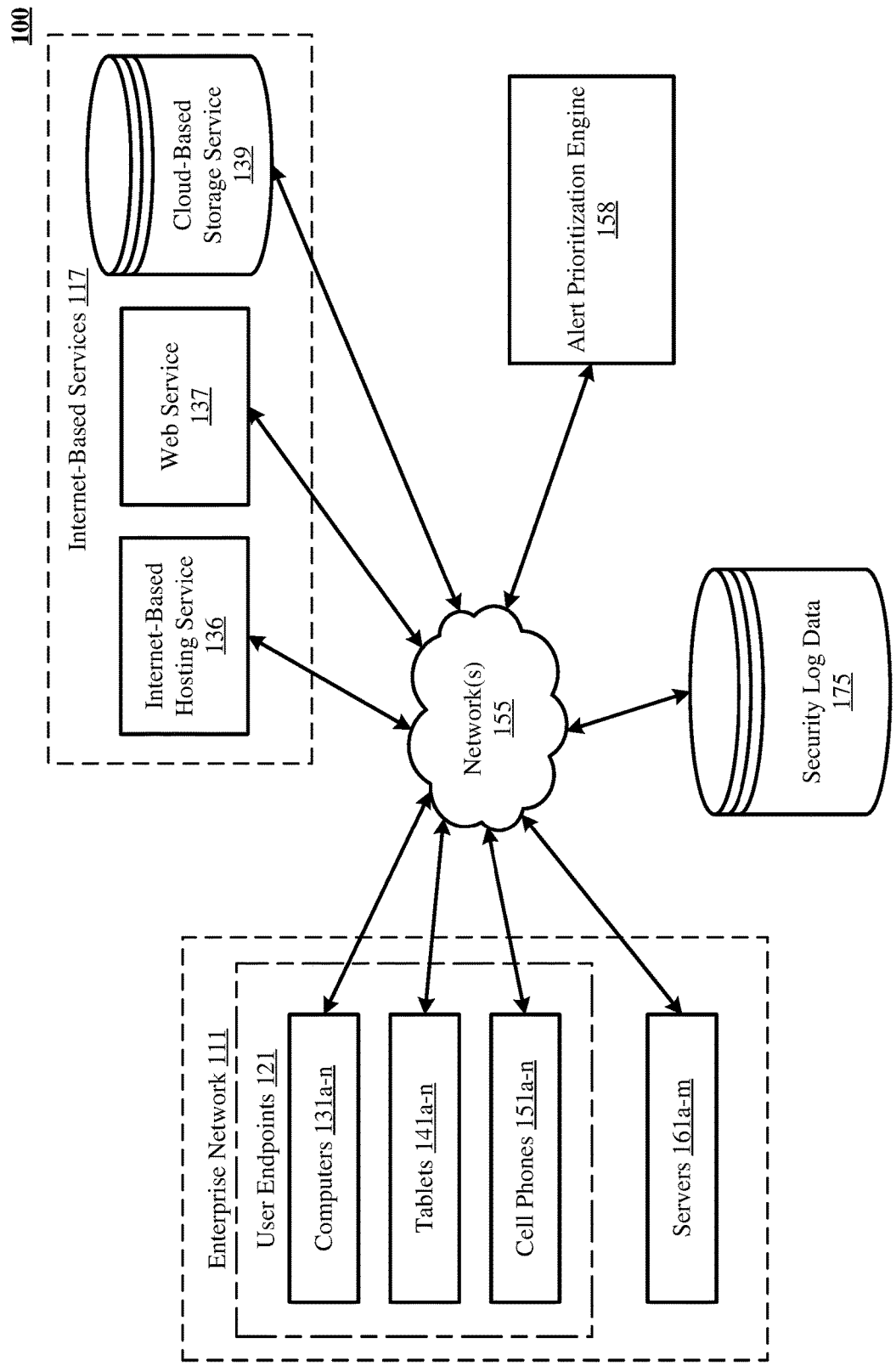
FIG. 1 illustrates an architectural level schematic of a system in which an alert prioritization engine is used to automatically group security alerts and present prioritized alerts to a security analyst.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

INTRODUCTION

Protecting enterprise networks against cybersecurity attacks is a priority of every organization. Gigabytes of security log data can be generated by packet filters, firewalls, anti-malware software, intrusion detection and prevention systems, vulnerability management software, authentication servers, network quarantine servers, application servers, database servers and other devices, even in a single 24 hour period. The logs generated by these systems contain alerts for different entities of the computer network. Some security systems assign scores to such alerts. However, not all alerts are equal and some alerts are false positives. Security analysts determine from voluminous logs alerts that present a threat that require immediate attention. Groups of security alerts, spanning different entities in the enterprise network, can be more telling than individual alerts, but grouping is challenging and time consuming.

Graphs of enterprise networks can help security analysts visualize entities in the computer network and their alert status. The technology disclosed builds on a graph of enterprise network, with nodes representing entities in the network. The technology disclosed assigns alert scores generated by security systems to nodes or edges connecting the nodes. We refer to these assigned alert scores as "native" scores, to distinguish them from scores resulting from propagation through the graph. Different types of edges represent different types of relationships between the nodes. Consistent with edge types, we assign weights to edges representing the strength of the relationship between the connected nodes. Simply rendering an annotated graph would create a visualization of logs, but would be too cluttered to facilitate prioritization of threats to the enterprise network, so we do more.

The technology disclosed reduces the burden on security analysts by automatically finding groups of security alerts and presenting prioritized groups to the security analyst. This includes applying rules to propagate the native scores through the graph, leading to node clusters based on an aggregation of native and propagated alert scores.

Graph traversal determines the propagated impact of a native alert score on connected, neighboring nodes. The technique can involve an extra step if alert scores are assigned to edges, a step of imputing the assigned alert scores to one node or both connected nodes, in cases of a directed edge or of an undirected or bi-directed edge, respectively. Alternatively, scores on edges can be propagated in the same way that we describe propagating scores on nodes. For each starting node with a native alert score, we traverse the graph following edges from the starting node to propagate the starting node's native alert score to neighboring nodes. Native scores of other nodes encountered during the propagation are ignored, are handled when those other nodes become starting nodes. Traversal can be terminated after a pre-determined number of edges/nodes, such as five, or when propagation attenuates the score below a predetermined threshold. Weights on edges attenuate propagation. We normalize the propagated score at each visited node using the number of edges of the same type connected to the visited node, which also attenuates propagation. For instance, a node representing a server may be connected to a hundred client nodes and so receives only a small contribution propagated from each client node. Over multiple propagations from starting nodes, we sum the propagated scores at visited nodes to accumulate aggregate scores. The sum of propagated scores can be further normalized based on a sum of weights of relationship strengths on edges connected to the visited node. Scoring supports clustering for prioritized display.

The technology disclosed clusters connected nodes based on uninterrupted chains of summed propagated scores. Connected nodes are clustered when they have aggregate scores above a selected threshold. Clusters are separated by at least one node that has an aggregated score below the selected threshold, effectively breaking the chain. The threshold can be a predetermined score, a ratio of scores between connected nodes, or a combination of both. For instance, a pair of connected nodes can be separated into different clusters when one node has a score 10× the other node. We calculate cluster scores by summing aggregate scores of nodes in the cluster and, in some instances, normalizing the sum. We rank and prioritize clusters for display and potential analysis using the cluster scores.

System Overview

We describe a system to group security alerts generated in a computer network and prioritize grouped security alerts for analysis. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes system 100. This paragraph names the labelled parts of system 100. The figure illustrates user endpoints 121, servers 161a-m, a network(s) 155, an Internet-based hosting service 136, a web service 137, a cloud-based storage service 139, an alert prioritization engine 158, and a security log database 175. Internet-based hosting service 136, the web service 137, and the cloud-based storage service 139 are collectively referred to as Internet-based services 117. User endpoints 121 and servers 161a-m are part of an enterprise network 111.

Servers 161a-m and user endpoints 121 such as computers 131a-n, tablets 141a-n, and cell phones 151a-n access and interact with the Internet-based services 117. In one implementation, this access and interaction is modulated by an inline proxy (not shown in FIG. 1) that is interposed between the user endpoints 121 and the Internet-based services 117. The inline proxy monitors network traffic between user endpoints 121 and the Internet-based services 117 and can include detection of malicious activity to protect enterprise network and data. The inline proxy can be an Internet-based proxy or a proxy appliance located on premise. The log data collected by the inline proxy can be stored in the security log database 175.

In a so-called managed device implementation, user endpoints 121 are configured with routing agents (not shown) which ensure that requests for the Internet-based services 117 originating from the user endpoints 121 and response to the requests are routed through the inline proxy for policy enforcement. Once the user endpoints 121 are configured with the routing agents, they are under the ambit or purview of the inline proxy, regardless of their location (on premise or off premise).

In a so-called unmanaged device implementation, certain user endpoints that are not configured with the routing agents can still be under the purview of the inline proxy when they are operating in an on premise network monitored by the inline proxy. Both managed and unmanaged devices can be configured with security software to detect malicious activity and store logs of security events in the security log database 175.

The enterprise users access Internet-based services 117 to perform a wide variety of operations such as search for information on webpages hosted by the Internet-based hosting service 136, send and receive emails, upload documents to a cloud-based storage service 139 and download documents from the cloud-based storage service 139. The log database accumulates logs of events related to users and the enterprise from multiple sources. Two sources of such log data include security systems and operations systems. Security systems include packet filters, firewalls, anti-malware software, intrusion detection and prevention systems, vulnerability management software, authentication servers, network quarantine servers. Operations systems include servers, workstations, caches and load balancers and networking devices (e.g., routers and switches). These systems can report hundreds, thousands or millions of events in an enterprise network in one day. Some security systems apply scores (such as on a scale of 1 to 100) indicating the risk associated with an individual event. An alert with a score of 100 likely poses a higher threat to the organization's network as compared to an alert with a score of 10. Not all alerts reported in the logs present the same level of threat and some alerts are false positives. Security analysts can review these logs to identify and analyze high priority alerts that present threats to the enterprise network 111 by well-equipped adversaries, but doing so is tedious.

High priority situations are often presented as a group of interrelated security alerts generated for different entities in the computer network. It is challenging and time consuming to identify these groups of alerts using logs of security data. The technology disclosed reduces burden on security analyst by automatically finding groups of security alerts and presenting prioritized groups to the security analyst. This grouping of security alerts and prioritizing of grouped alerts enables security analyst to focus on nodes that are of interest for high risk security events. Consider a first example of a log entry in the security log database 175 reporting a security event indicating a failed authentication from a user endpoint 121. Now consider a second example of a log entry in the security log database 175 which is also an authentication failure but represents a high risk to the organization. In the second example, an attacker has gained access to a user endpoint 121 in the enterprise network 111. The attacker steals confidential information from the compromised user endpoint. Such information can include a list of servers 161a-m in the enterprise network. The attacker then attempts to authenticate to the servers. This can result in a spike in the number of failed authentications from the compromised user endpoint. The attacker can also move laterally to other user endpoints in the enterprise network. The second example presents a situation which requires accelerated investigation by a security analyst.

A serious cyberattack on an enterprise network will likely raise interrelated alerts from multiple, disjoint security systems. Alerts from some of the monitored entities present higher risks than alerts from other entities. For example, a malware execution on a user endpoint 121 may not have the same priority level as compared to a malware execution on a system used as a jump box to access other user endpoints in the network. The security analyst can be well advised to analyze the jump box alert before the endpoint alert, as the jump box immediately impacts many entities in the network. When the analyst reviews a log that doesn't highlight the roles of the jump box and endpoint, it is difficult to prioritize the alerts.

Graphs of enterprise networks can help security analysts visualize entities in the computer network and their alert status. The technology disclosed builds on a graph of enterprise network, with nodes representing entities in the network. Examples of entities include user endpoints 121, servers 161 a-m, file names, usernames, hostnames, IP addresses, mac addresses, email addresses, physical locations, instance identifiers, and autonomous system numbers (ASNs) etc. These example entities typically exist across a longer time scale in an enterprise network, however entities that are short-lived can also be included in the graph if they are important for presenting the correlations, for example, certain emails and transaction identifiers, etc. The technology disclosed builds on a graph of enterprise network with nodes, representing entities, connected with each other by edges representing different connection types. The technology disclosed assigns alert scores generated by security systems to respective nodes or edges connecting the nodes.

The nodes in graphs of enterprise computer network are connected to each other with different types of edges representing different types of relationships between the nodes. Examples of connection types can include an association connection type, a communication connection type, a failure connection type, a location connection type, and an action or operation connection type. The first association connection type indicates that two entities are associated, for example, a host is assigned an IP address statically or via dynamic host configuration protocol (DHCP). The second communication connection type indicates that network communication is observed between two connected entities in the enterprise network. The third failure connection type indicates that an action was attempted but failed, for example a failed authentication attempt. The fourth location connection type indicates geographical relationships between connected entities, for example, an IP address is associated with a geographic region. The fifth action or operation connection type indicates an action or an operation was performed by one of the connected entities. Entities can perform actions, for example, a user can perform an authentication action on a host or a host can execute a process. Additional connection types can be present between entities in the enterprise computer network.

The technology disclosed assigns weights to edges representing the strength of the relationship between the connected nodes. Alerts can also be represented as edges between nodes representing entities in the network. Alert edges can be in addition to other types of edges connecting nodes. The weights reflect the connections types represented by the edges. For example, an association connection between a user and an IP address is stronger than an authentication action connection between a user and a host, because the IP address is associated with the user for longer than the authenticated session of the user on the host. Under these circumstances, the weight assigned to an edge representing an association connection type would be more than the weight assigned to an edge representing an authentication action connection type.

We refer to these assigned alert scores as "native" scores to distinguish them from scores resulting from propagation through the graph. Graph traversal determines impact of native alert scores of nodes on connected, neighboring nodes. If alert scores are assigned to edges, the technology disclosed imputes the score to one or both connected nodes, in case of directed or undirected or bi-directed edge, respectively. In another implementation, the technology disclosed propagates alert scores on edges in the same way as propagation of scores assigned to nodes is described.

The technology disclosed propagates native scores from starting nodes with non-zero native scores. For each starting node, we traverse the graph to propagate starting node's native score to connected, neighboring nodes. Native scores of other nodes encountered during the propagation are ignored, until those score loaded nodes become starting nodes. Traversal can be terminated after a predetermined span from the starting node or when the propagated score falls below a threshold. Weights on edges attenuate (or amplify) the propagated score. Additionally, we normalize the propagated score at each visited node using the number of edges of the same type connected to the visited node to attenuate the propagated score. The propagated scores at visited nodes are accumulated over multiple traversals from different starting nodes, to determine aggregate scores.

The technology disclosed reduces the burden on the security analyst by clustering connected nodes based on uninterrupted chains of aggregate scores. Connected nodes are clustered when they have aggregate scores above a threshold. The threshold can be a predetermined value of aggregate score, a ratio of scores between connected nodes, or a combination of both. Cluster scores are calculated by summing aggregate scores of nodes in the clusters. Clusters with higher cluster scores are prioritized for review by security analyst.

Completing the description of FIG. 1, the components of the system 100, described above, are all coupled in communication the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

System Components—Alert Prioritization Engine

Figure 2:
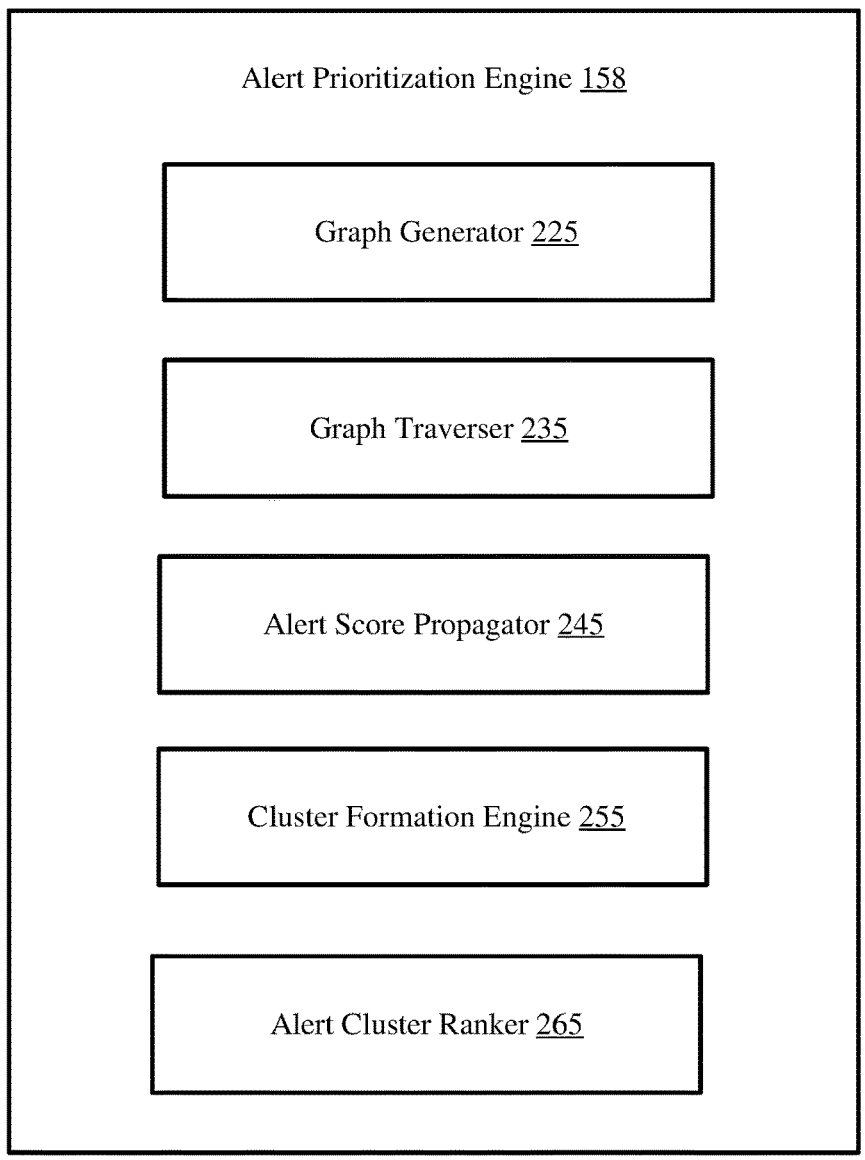
FIG. 2 is a block diagram example of components of the alert prioritization engine of FIG. 1.

FIG. 2 is a high-level block diagram 200 illustrating subsystem components of the alert prioritization engine 158. The subsystems can include a graph generator 225, a graph traverser 235, an alert score propagator 245, a cluster formation engine 255, an alert cluster ranker 265. These subsystems are computer implemented using a variety of different computer systems as presented below in description of FIG. 13. The illustrated subsystem components can be merged or further separated, when implemented. The features of the subsystems are described in the following paragraphs.

Graph Generator

The technology disclosed presents an enterprise network in a graph, with computer network entities represented by nodes connected by edges. The graph generator 225 can use the information in the security log database 175 to determine entities in the network. If a network topology is available, it can begin with a previously constructed node list. The graph generator can also use log data of operations systems such as servers, workstations, caches and load balancers, and network devices (e.g., routers and switches) to build a network topology. The graph generator connects entity nodes using edges that represent different types of relationships between the entities. Examples of entities and relationships are presented above. Alerts can also be represented as edges between nodes. Alert edges can be in addition to other types of edges connecting the nodes. The graph generator further assigns native alert scores to nodes that capture alert scores generated by security systems. In one implementation, the graph generator distributes alerts scores assigned to edges to the nodes connected by the edges. In case of a directed edge, an edge assigned score can be distributed to the node at a source or destination of the edge, instead of both. In case of an undirected or bi-directed edge, the score is distributed between the two nodes connected by the edge. In case of an edge connecting a node to itself (i.e., a loop), the entire score is assigned to the connected node. In another implementation, the technology disclosed retains the scores on edges and uses the edge scores in propagation of native scores to nodes connected with the edges. The graph generator 225 assigns weights to edges connecting the nodes based on a connection type of the edge. The weights represent relationship strength between the nodes connected by the edge. For example, an association type relationship is stronger than an action type relationship as explained above. Therefore, the graph generator can, for example, assign a weight of 1.0 to the edge representing an association type connection and a weight of 0.9 to an edge representing an action type connection. In one implementation, the edge weights are on a scale of 0 to 1. A higher score is given to edges of a connection type representing a stronger relationship.

Graph Traverser

The graph traverser 235 systematically traverses the graph representing the computer network to propagate native scores for alerts associated with the starting nodes with non-zero scores. For each starting node with a non-zero native score, the graph traverser 235 traverses the graph following edges from the starting node to propagate the starting node's native alert score to neighboring nodes. The traversal terminates after visiting a predetermined number of edges or nodes or when the propagated score attenuates below a predetermined threshold. An example pseudocode of a recursive graph traversal algorithm is presented below. In the following pseudocode, the native score of a starting node is referred to as an "initial_score" and an aggregated score of a visited node is referred to as a "priority_score".

Prerequisites: Every node in the graph has an initial_score which can be non-zero or zero. The algorithm computes a new score, the priority_score, for each node by propagation and aggregation. This is initialized to zero for all nodes. The priority_score will be used to determine the clusters.

Comment: Starting with each node with non-zero initial score, we traverse. Every time we start a traversal, we empty the set of visited nodes and spread the initial score of the starting node around.

Start

```
for node in Set( nodes where initial_score > 0 ) do:
    visited_nodes = Set( )
    traverse(node, node.initial_score)
```

Comment: For the traversal, we propagate the starting score around to its neighbors until its magnitude falls below a preset threshold. The scorePropagator function calculates the score to propagate to the neighbors.

```
function traverse(node, score_to_propagate):
    add node to visited_nodes
    node.priority_score += score_to_propagate
    if score_to_propagate > threshold:
        for neighbor in node.neighbors where neighbor is not in
          visited_nodes:
            neighbor_score = scorePropagator(node, neighbor)
            traverse(neighbor, neighbor_score)
End
```

Alert Score Propagator

As the graph traverser 235, traverses the graph representing the computer network, the alert score propagator 245 calculates propagated score at visited nodes. For a visited node v, we represent the aggregate score of a node α(v) in equation (1) as sum of its native score and scores propagated to the visited node. The aggregate score, native score and propagated score are referred to as priority_score, initial_score, and neighbor_score, respectively, in the graph traversal pseudocode presented above.

The aggregate score of a node α(v) can be recursively calculated by applying equation (1):

$$\alpha(v) = \sum_{a \in A(v)} \text{score}\,(a) + \frac{1}{1+W} \sum_{\text{edge type } T} w_{gms}(T) \sum_{n \in N_T(v)} \frac{1}{|N_T(n)|} \alpha(n)$$

where the base case is presented below in equation (2):

$$\alpha(n) = \sum_{a \in A(n)} \text{score}\,(a)$$

Tail recursion is one way to propagate a native score from a starting node through connected nodes in the graph.

Equation (1) has two parts. The simpler, first part of equation (1) is a native alert score, a sum of alert scores (a) generated by security systems and assigned to node (v) and/or edges connected to node (v). The same approach can, of course, be applied to scores other than security alert scores, for collapsible graphs other than security graphs.

The second part of equation (1) is a nested sum comprising three terms that represent propagated scores contributed by neighboring nodes n score to the visited node v's score. The propagated score from neighboring node n is attenuated by the three terms.

The outer term $$\frac{1}{1+W}$$

attenuates the propagated score by an inverse of the sum of weights of edges $W=\Sigma(w_{gms}(T))$ of all connection types T incident on the visited node v. The added 1 in the denominator assures attenuation and prevents a divide by zero condition.

The outer summation $\Sigma_{\text{edge type }T} w_{gms}(T)$ iterates over edge types incident to the visited node v. This term attenuates propagated scores for a particular edge type T by a weight $w_{gms}(T)$ assigned to an edge of connection type T. In general, edge types in the graph are assigned weights corresponding to the strength of the relationship of the connection type represented by the edge. The stronger the relationship, the higher the weight. A weight for a particular edge type T is applied to an inner sum—the outer and inner sums are not calculated independently.

$$\sum_{n \in N_T(v)} \frac{1}{|N_T(n)|} \alpha(n)$$

Finally, the inner summation iterates over edges of type T to calculate an average score for nodes connected to visited node v by each edge type. The denominator factor $N_{T(v)}$ represents the number of neighbors of the visited node that are connected to the visited node with a same edge connection type T.

Equation (1) is conceptual, whereas the graph traversal pseudocode, above, is practical. Equation (1) defines one recursive calculation of an aggregate score that applies to any node in a graph representing the computer network. Applying Equation (1) directly would involve fanning out from a starting node to draw propagated scores from neighboring nodes into the starting node. The graph traversal pseudocode follows a different, more practical strategy to calculate the propagated scores. It can start at nodes that have non-zero native alert scores and traverse the graph of computer network, avoiding cyclic calculation mistakes. Alternatively, the traversal can start at leaf nodes, or at both leaf and interior nodes, or at some selected subset of all the nodes in the graph. In some implementations, the propagation can be stopped after the propagated score falls below a threshold, as reflected in the pseudocode for graph traversal. In another implementation, the native scores can be propagated from a starting node for a given number of network hops, for example, the scores can be propagated up to five edge or network hops from the starting node. Graph traversal pseudocode presented above is one practical example that applies Equation (1). It is understood that other graph traversal algorithms can be applied to propagate scores.

Cluster Formation Engine

The cluster formation engine 255 uses the aggregate scores for nodes in the graph of computer network to form clusters of connected nodes. The graph formation engine sorts the nodes in the graph in a descending order of aggregate scores. Starting with the node with a highest aggregate score, the graph formation engine 255 traverses the graph and adds a neighboring node in a cluster if the aggregate score of the neighboring node is above a selected threshold. When the graph formation engine 255 reaches a node that has an aggregate score below a set threshold, the chain of connected nodes in the cluster is broken. The threshold can be a predetermined aggregate score or a ratio of scores between nodes, or a combination of both. When using a ratio of scores, the chain of connected nodes can be broken when one node in a pair of connected nodes has a score greater than ten times the other node in the pair of connected nodes. It is understood that when using a ratio of scores, the threshold for breaking the chain of connected nodes can be set at greater at a higher value. For example, the chain of connected nodes can be broken when one node in a pair of connected nodes has a score fifteen, twenty, or twenty five times the score of the other node. Similarly, the threshold for breaking the chain of connected nodes can be set at values lower values. For example, the chain of connected nodes can be broken when one node in a pair of connected nodes has a score five times, three times or two times the score of the other node.

Alert Cluster Ranker

The alert cluster ranker 265 ranks and prioritizes clusters formed by the cluster formation engine 255. Alert cluster ranker 265 calculates cluster scores by summing aggregate scores of nodes in the cluster. The clusters of connected nodes are displayed to the security analyst who can then focus on high ranking clusters first before reviewing the other clusters.

In the following sections, we describe the technology disclosed using two example graphs of computer networks. The examples start with a graph of a computer network in which native scores are assigned to nodes, based on alerts, and weights are applied to edges, based on connection types. The formulation presented in equation 1 is used to propagate native scores of starting nodes to connected nodes. Aggregate scores for nodes are calculated by summing propagated scores and native scores. Finally, clusters are formed. The first example results in one large cluster of connected nodes in the graph. The second example results in two small clusters of connected nodes in the graph.

First Example of Alert Prioritization

Figure 3:
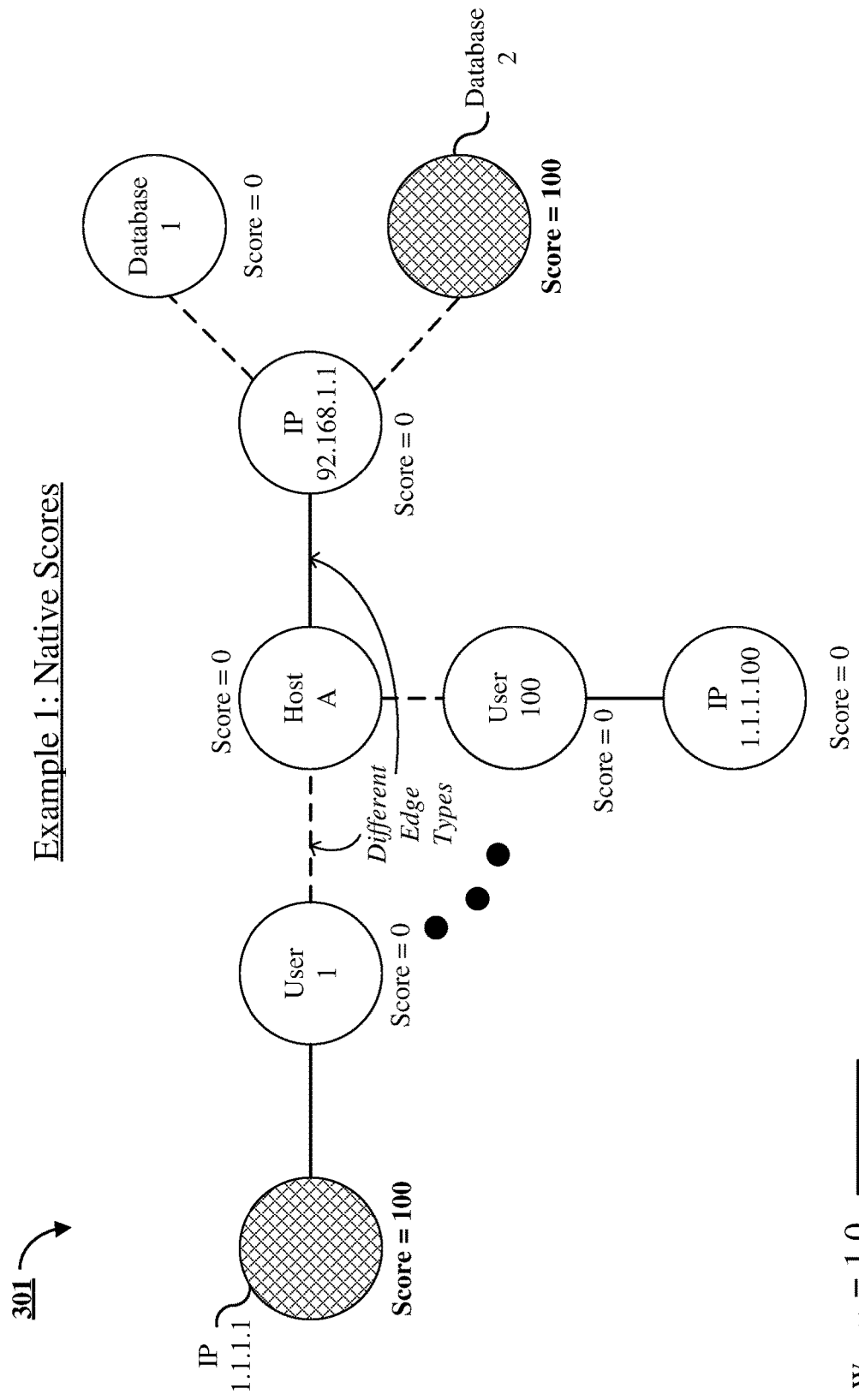
FIG. 3 illustrates native scores assigned to nodes in a first example graph of an enterprise network.

FIG. 3 presents a graph 301 of a computer network in which a host A is connected to a hundred users (user 1 to user 100). Users are connected to the host through an action type connection which is represented by broken lines connecting user nodes with the host A node. Each user has an IP address which is represented as a node and connected to respective user node through an association type connection. For example, the node representing IP address 1.1.1.1 is connected to user 1 and the node representing IP address 1.1.1.100 is connected to user 100. The association type connection is represented by solid lines in the graph 301. Users 2 through 99 and corresponding IP addresses are not shown in the graph to simplify the example for explanation purposes. The host A is connected to a node representing its IP address 92.168.1.1 through an association type connection. The host is communicating with two databases: database 1 and database 2. The two databases are connected to host A via the node representing the host's IP address 92.168.1.1 node. The IP address 92.168.1.1 has action type connections with the two database nodes.

Two nodes, IP 1.1.1.1 and database 2, in the graph 301 have non-zero native alert score and are thus selected as starting nodes. The node representing IP address 1.1.1.1 has a native alert score of 100 and the node representing the database 2 also has a native alert score of 100. Starting nodes are shown with cross-hatch pattern in the graph. All other nodes in the graph have native scores of zero. Edges representing association type connections, drawn as solid lines, have a weight of 1. Edges representing action type connections, drawn as broken lines, have a weight of 0.9. As described above, association type connection is stronger than action type connection.

Figure 4A:
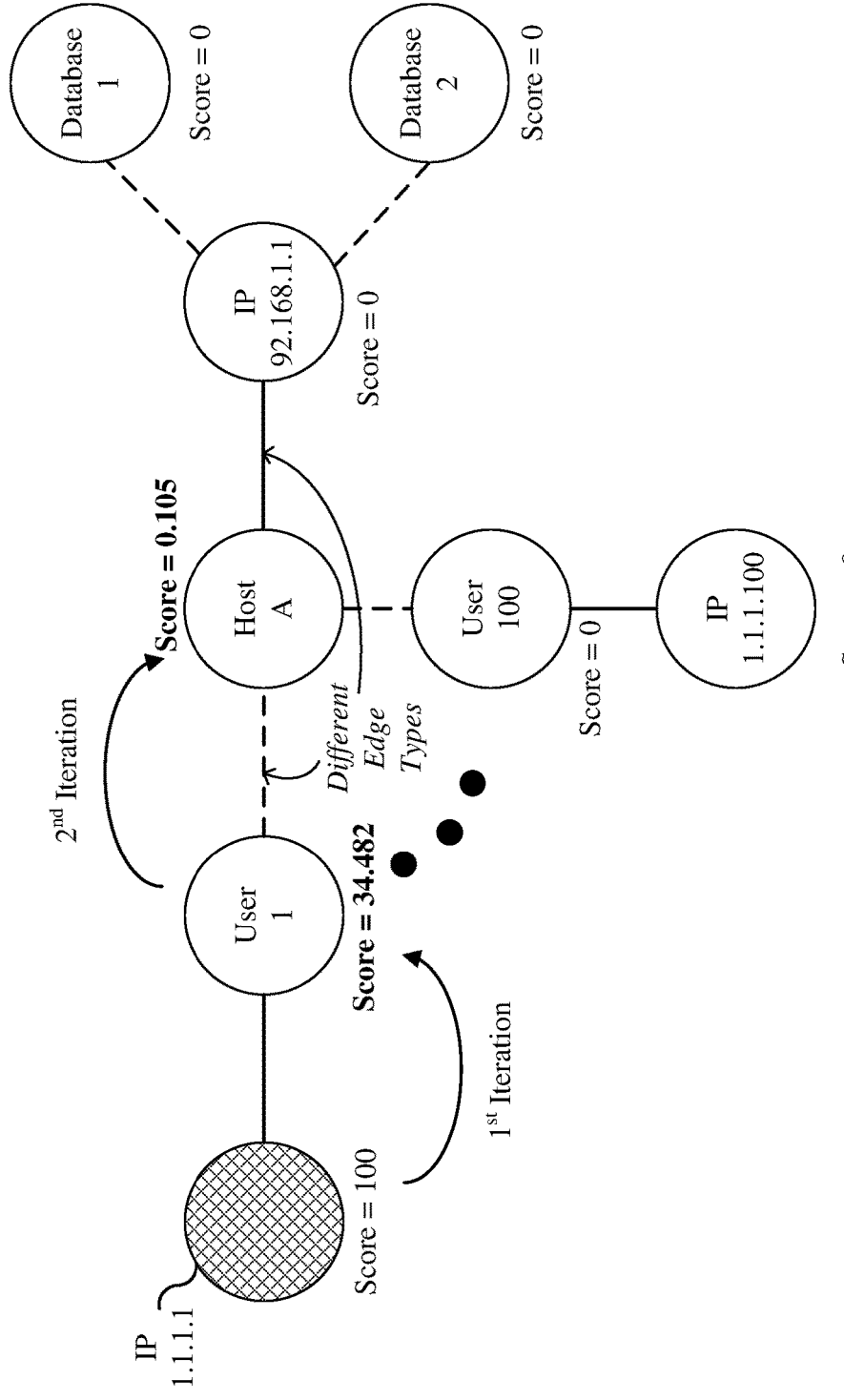
FIGS. 4A, 4B, and 4C illustrate propagated scores from a first starting node in the first example graph presented in FIG. 3.

A first set of figures (FIGS. 4A to 4C) illustrates the propagated impact of native alert score on connected, neighboring nodes when the node representing IP 1.1.1.1 is selected as the starting node. The starting node IP 1.1.1.1 is shown with a cross-hatch pattern in a graph 401. First two iterations of propagation of native score from the starting node are shown in the graph 401. In the first iteration, the propagated score from starting node 1.1.1.1 to user 1 node is 34.482 and in the second iteration the propagated score to the host A node is 0.105. It can be seen IP 1.1.1.1 nodes propagates a higher (34.482) score to user 1 in the first iteration. While in the second iteration, a very small score (0.105) is propagated to host A node. The large attenuation of propagated score to the host A is due to a hundred user nodes connected to the host A node through edges of the same connection type. This makes the denominator in the term $$\frac{1}{|N_T(n)|}$$

in equation (1) as 100. Therefore, the contribution of user 1 node to the propagated score of host A node is very small (0.105) because there are a hundred similar users connected to the same host A node.

Figure 4B:
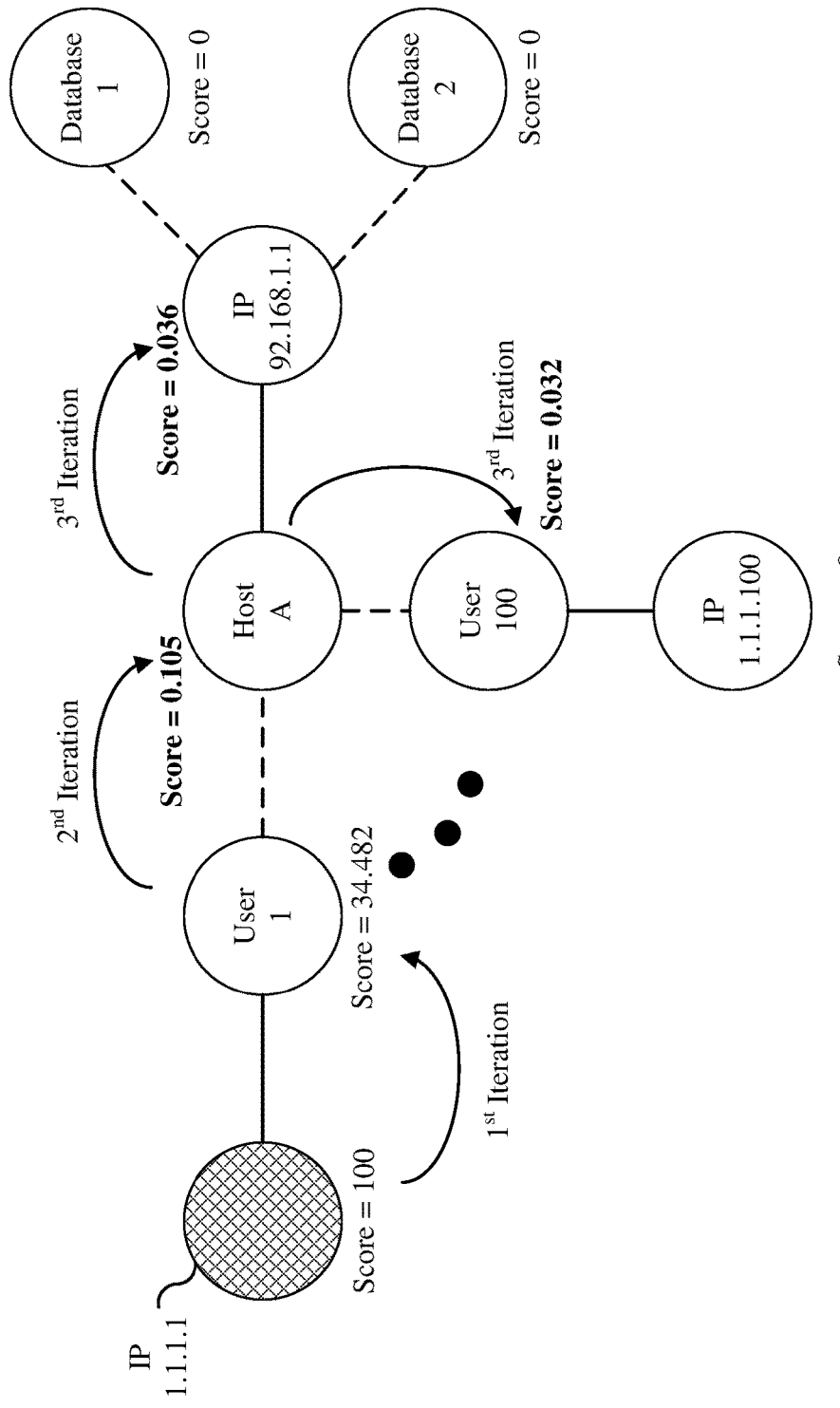
Figure 4C:
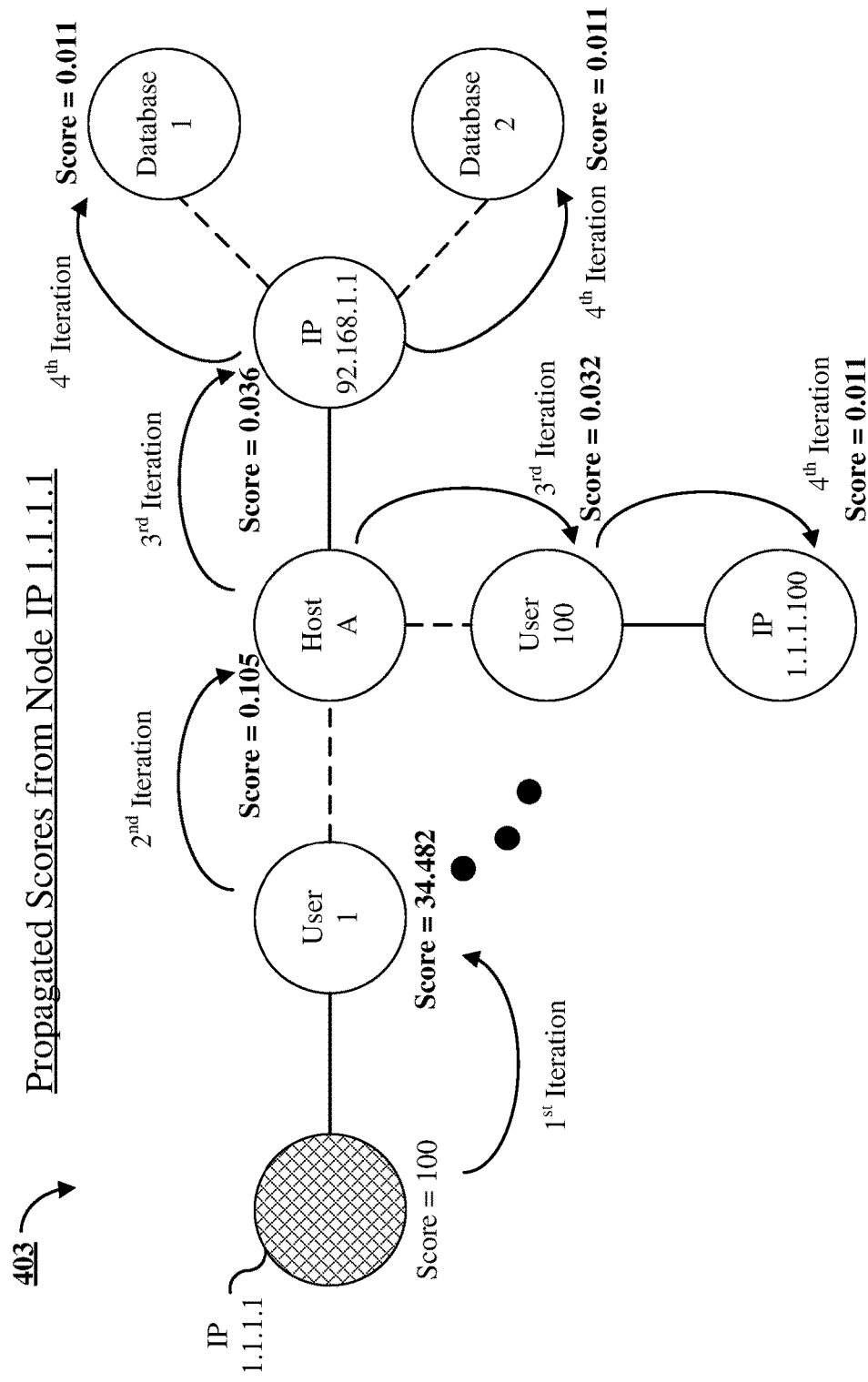

Propagated scores from IP 1.1.1.1 node in a third iteration are illustrated in a graph 402 in FIG. 4B. The host A node is connected to two nodes in addition to the user 1 node which is already visited in the previous iteration. Note that we are not showing the nodes for user 2 through user 99 connected to host A to simplify the example for illustration purposes. The host A node propagates the score to all connected nodes, except the nodes that have been visited in a previous iteration. As shown in the graph 402, the host A node propagates a score of 0.032 to each one of the two nodes IP 92.168.1.1 and user 100. A graph 403 in FIG. 4C illustrates the propagated scores in a fourth iteration. Nodes representing database 1, database 2 and IP 1.1.1.100 each receive a score of 0.011 in the fourth iteration.

Figure 5A:
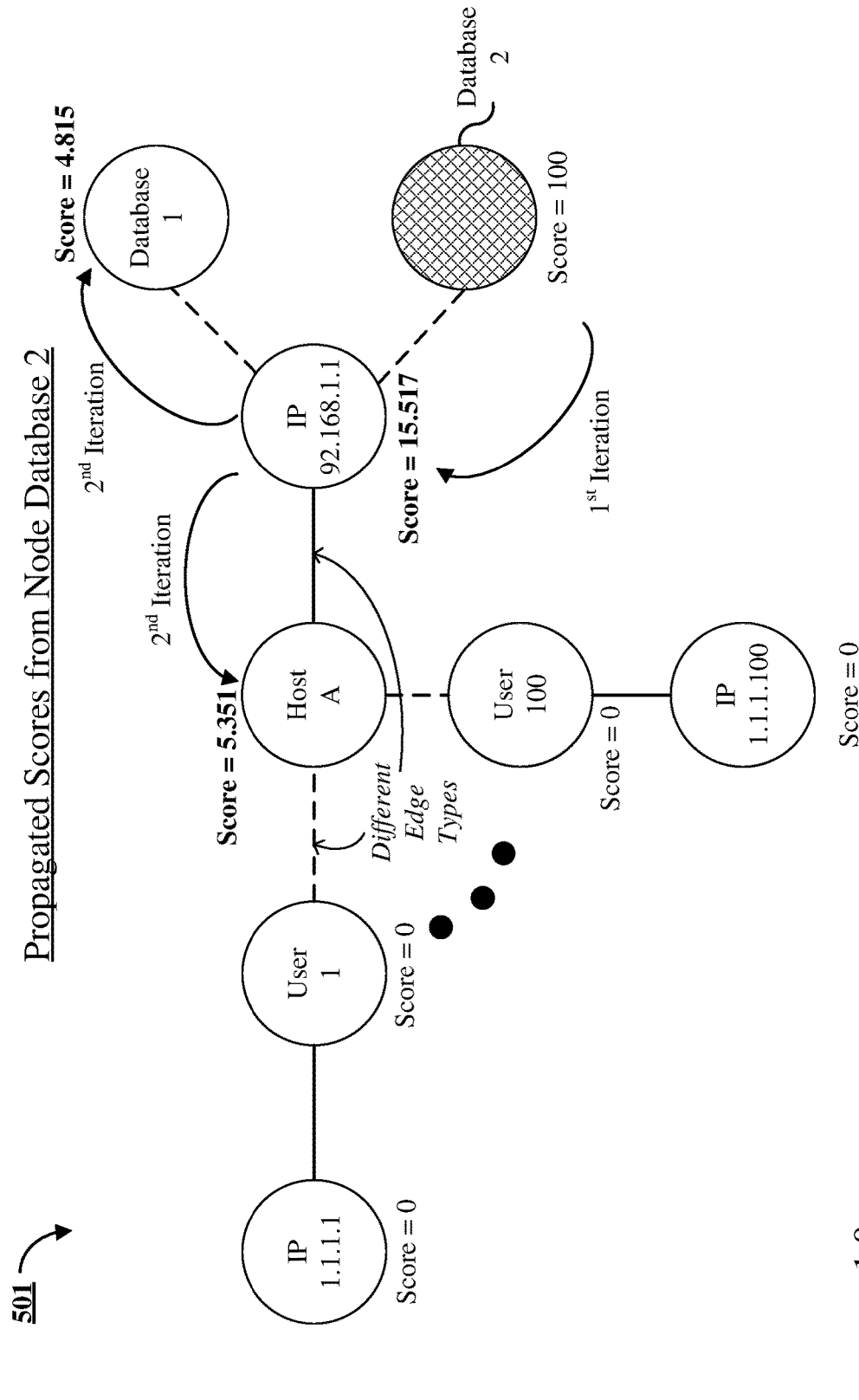
FIGS. 5A, 5B, and 5C illustrate propagated scores from a second starting node in the first example graph presented in FIG. 3.

Continuing with the first example, a second set of figures (FIGS. 5A to 5C) illustrates the propagated impact of native alert score on connected, neighboring nodes when the node representing database 2 is selected as the starting node. The starting node database 2 is shown with a cross-hatch pattern in a graph 501 in FIG. 5A. First two iterations of propagation of native score from the starting node are shown in the graph 501. In the first iteration, the propagated score to IP 92.168.1.1 node is 15.517. In the second iteration, host A node receives a score of 5.351 and database 1 node receives a score of 4.815. It can be seen that a higher value of score is propagated to host A from IP 92.168.1.1 as compared to the score propagated from user 1 node to host A when the starting node was IP 1.1.1.1. This is because IP 92.168.1.1 is the only node connected to the host A node with an association type connection while user 1 is one of 100 nodes connected to the host A with an action type connection.

Figure 5B:
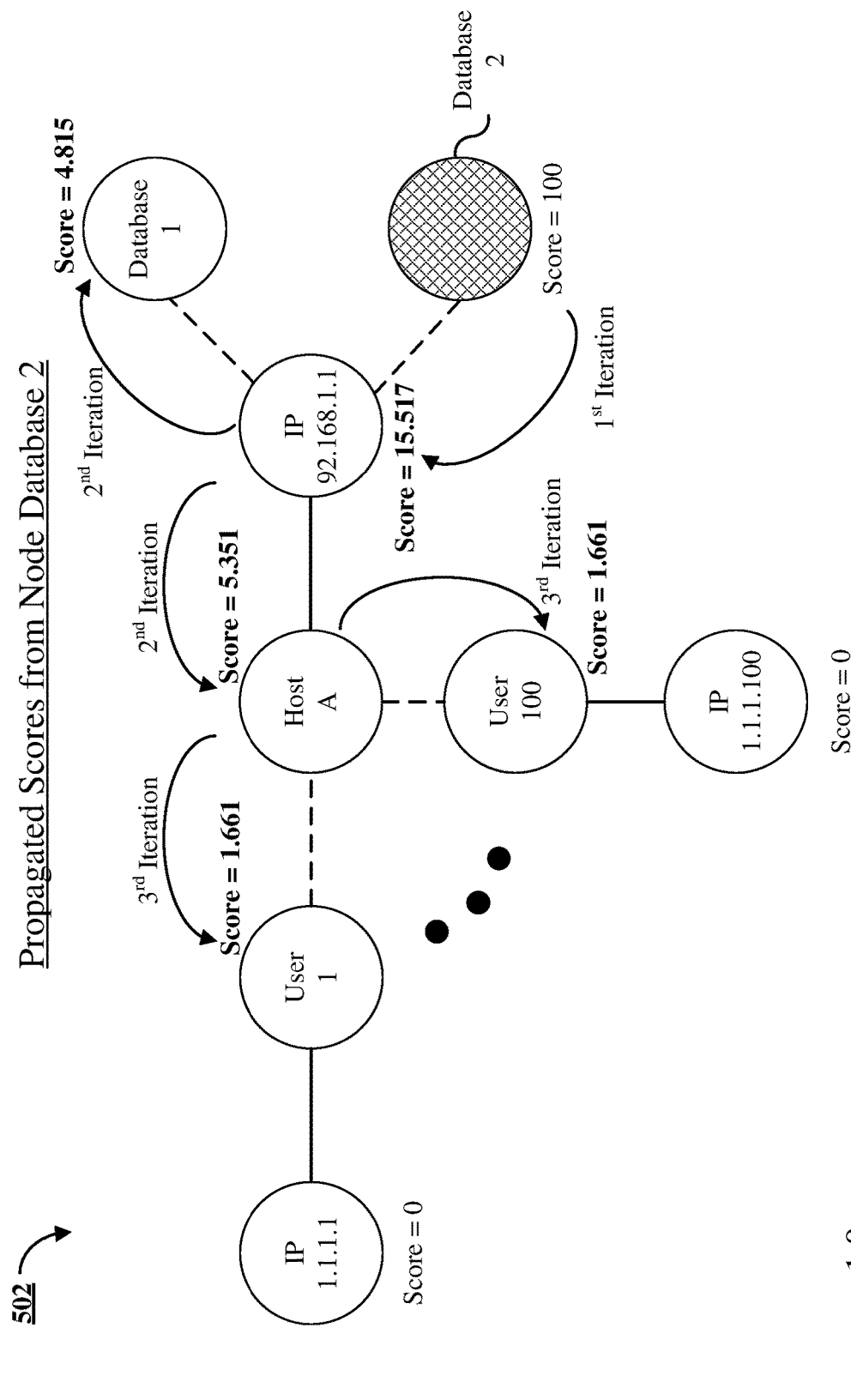
Figure 5C:
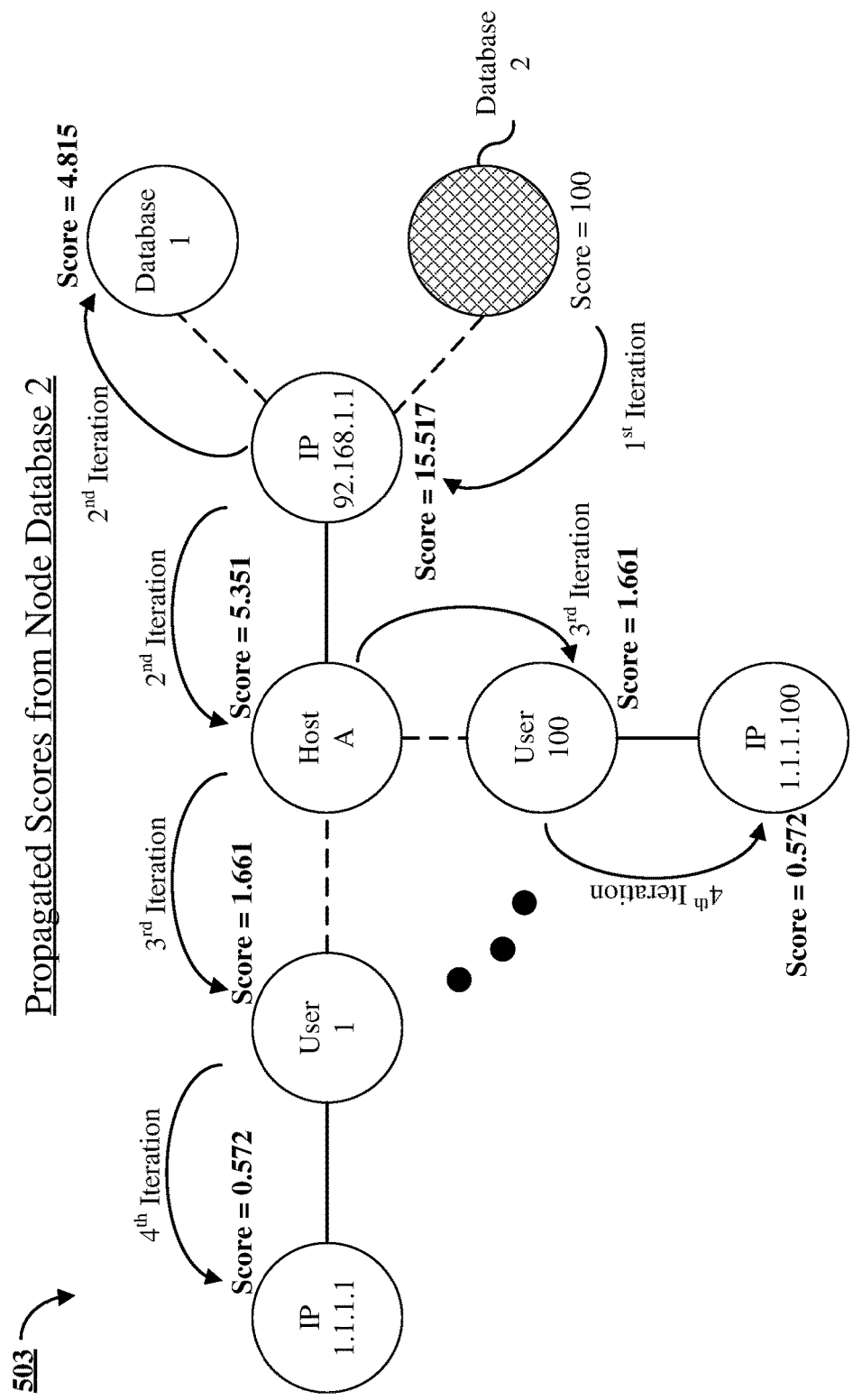

A third iteration of propagation of scores from the database 2 node is shown in FIG. 5B in a graph 502. In the third iteration, a score of 1.661 is propagated to each of the two nodes representing user 1 and user 100. Finally, in FIG. 5C, a fourth iteration of the propagated scores from starting node database 2 is illustrated in a graph 503. In the fourth iteration, a score of 0.572 is propagated to each of the two nodes representing IP 1.1.1.1 and IP 1.1.1.100.

Figure 6:
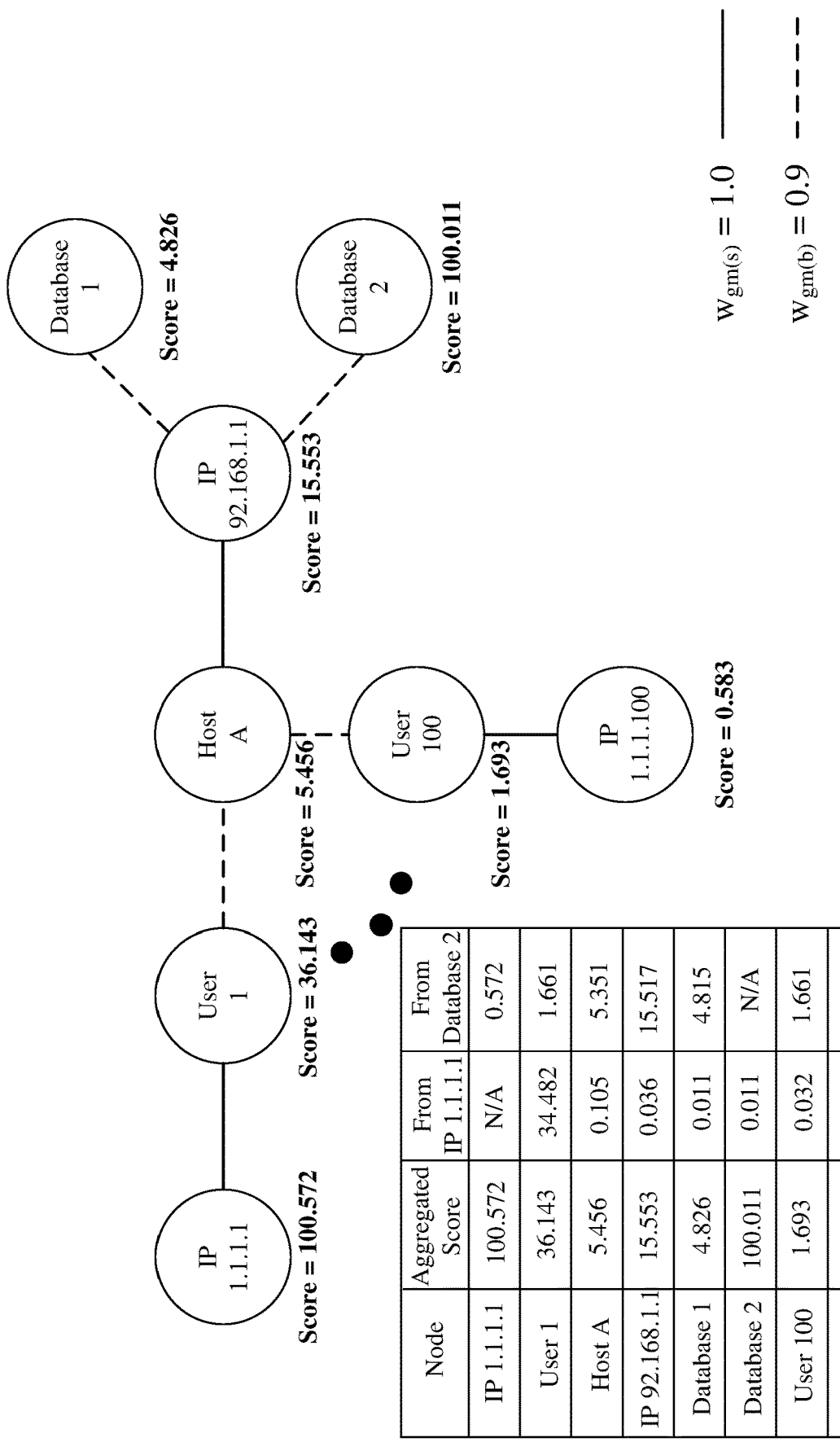
FIG. 6 presents aggregate scores for nodes in the first example graph presented in FIG. 3.
Figure 7:
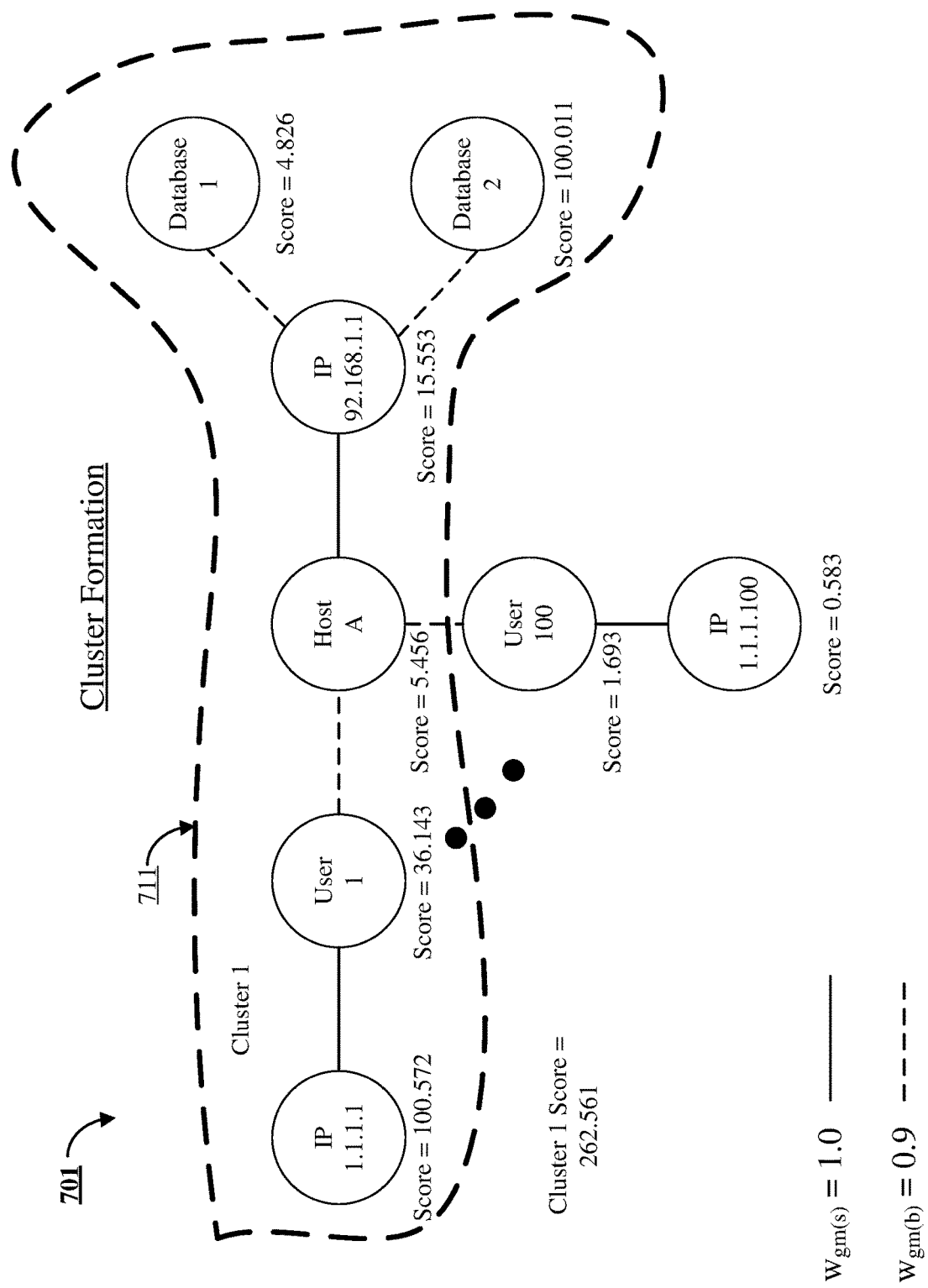
FIG. 7 presents cluster formation of connected nodes in the first example graph presented in FIG. 3.

FIG. 6 presents a graph 601 illustrating aggregate scores for the nodes in the first example. The aggregate score of a node in the graph is calculated by summing its native score with the propagated scores in the two propagations from two starting nodes with non-zero scores as presented above. The aggregate scores for each node are shown in the graph beside each node. The aggregate scores are also shown in a tabular format which shows the contribution to aggregate scores from the two propagations, the first with starting node IP 1.1.1.1 and the second with starting node database 2, respectively. Node representing IP 1.1.1.1 has the highest aggregate score and is therefore, selected as a starting node to form clusters of connected nodes. The cluster formation is presented in a graph 701 in FIG. 7. Starting with the node representing IP 1.1.1.1, the connected node user 1 is selected for evaluation to form a cluster. Aggregate score of the node representing user 1 is above a selected threshold of 2, therefore it is included in the cluster. Following this, the next node is host A having an aggregate score of 5.456 which is above the threshold and is also included in the cluster. The node representing host A is connected to the node representing IP 92.168.1.1 which has an aggregate score of 15.553 which is above the threshold value of 2 and is therefore included in the cluster. The node representing host A is also connected to the node representing user 100 which has a score of 1.693 which is below the threshold value of 2, therefore it is not included in the cluster. Node representing user 100 therefore, breaks the chain connecting the node representing host A and the node representing IP 1.1.1.100. Continuing to the third neighbor of host A, the node representing IP 92.168.1.1 is connected to the two nodes representing the database 1 and database 2, each having an aggregate score above the threshold value of 2. Therefore, database 1 and database 2 nodes are included in the cluster. The cluster of connected nodes is shown inside a cluster boundary 711. The cluster is labeled as cluster 1 and its score is 262.561 which is the sum of aggregate scores of all nodes included in the cluster 1.

Second Example of Alert Prioritization

Figure 8:
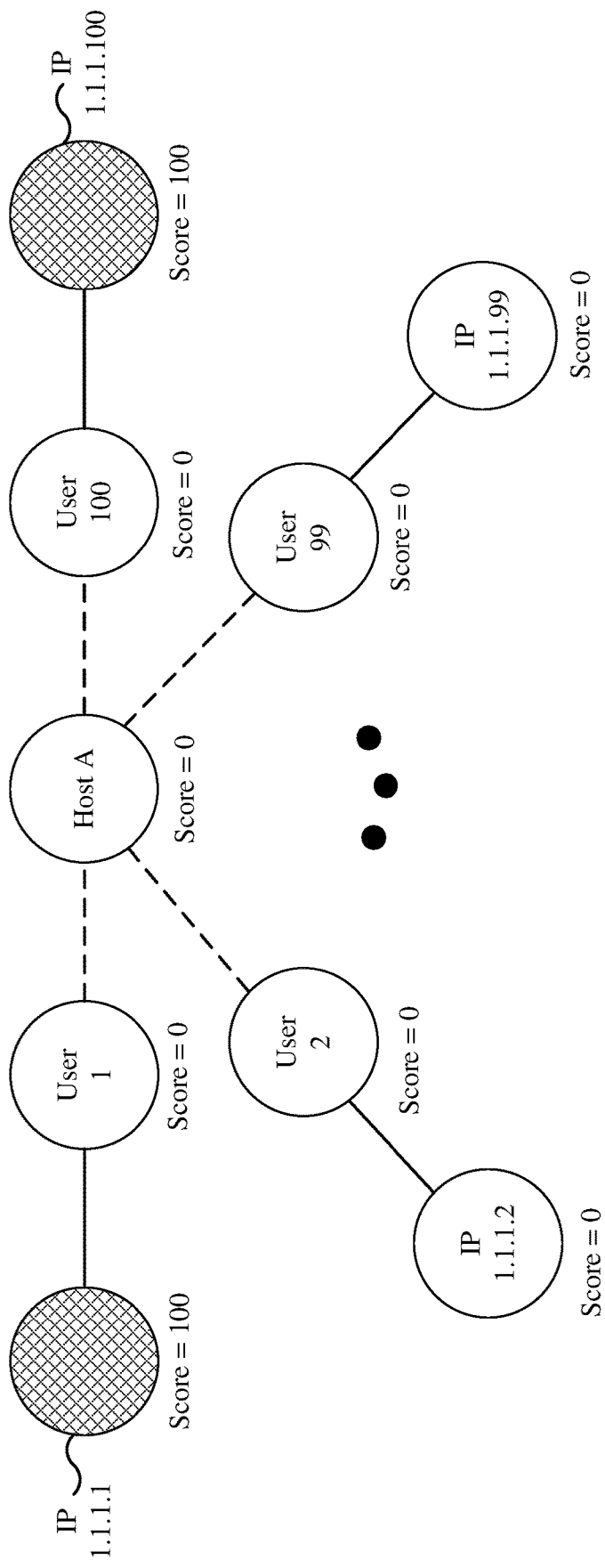
FIG. 8 illustrates native scores assigned to nodes in a second example graph of an enterprise network.

FIG. 8 presents a graph 801 of a computer network in which a host A is connected to a hundred users (user 1 to user 100). Users are connected to the host A through an action type connection which is represented by edges drawn as broken lines connecting user nodes with the host A node. Each user has an IP address which is represented as a node and connected to respective user through an association type connection. For example, the node representing IP 1.1.1.1 is connected to the node representing user 1, the node representing IP 1.1.1.2 is connected to the node representing user 2, the node representing IP 1.1.1.99 is connected to the node representing user 99 and the node representing IP 1.1.1.100 is connected to a node representing user 100. Users 3 through 98 and corresponding IP addresses are not shown in the graph to simplify the structure of the graph for illustration. Two nodes in the graph 801 have non-zero native alert score. The node representing IP address 1.1.1.1 has a native alert score of 100 and the node representing IP address 1.1.1.100 also has a native alert score of 100. These two nodes having non-zero native alerts scores are shown in the graph 801 with a cross-hatch pattern. All other nodes in the graph have native alert scores of zero. Edges drawn as solid lines represent association type connections and edges drawn as broken lines represent action type connections. As in example 1, edges representing association type connections are assigned weights of 1.0 indicating a higher relationship strength between the connected nodes. Edges representing action type connections are assigned weights of 0.9 indicating relatively lower relationship strength between the connected nodes.

Figure 9:
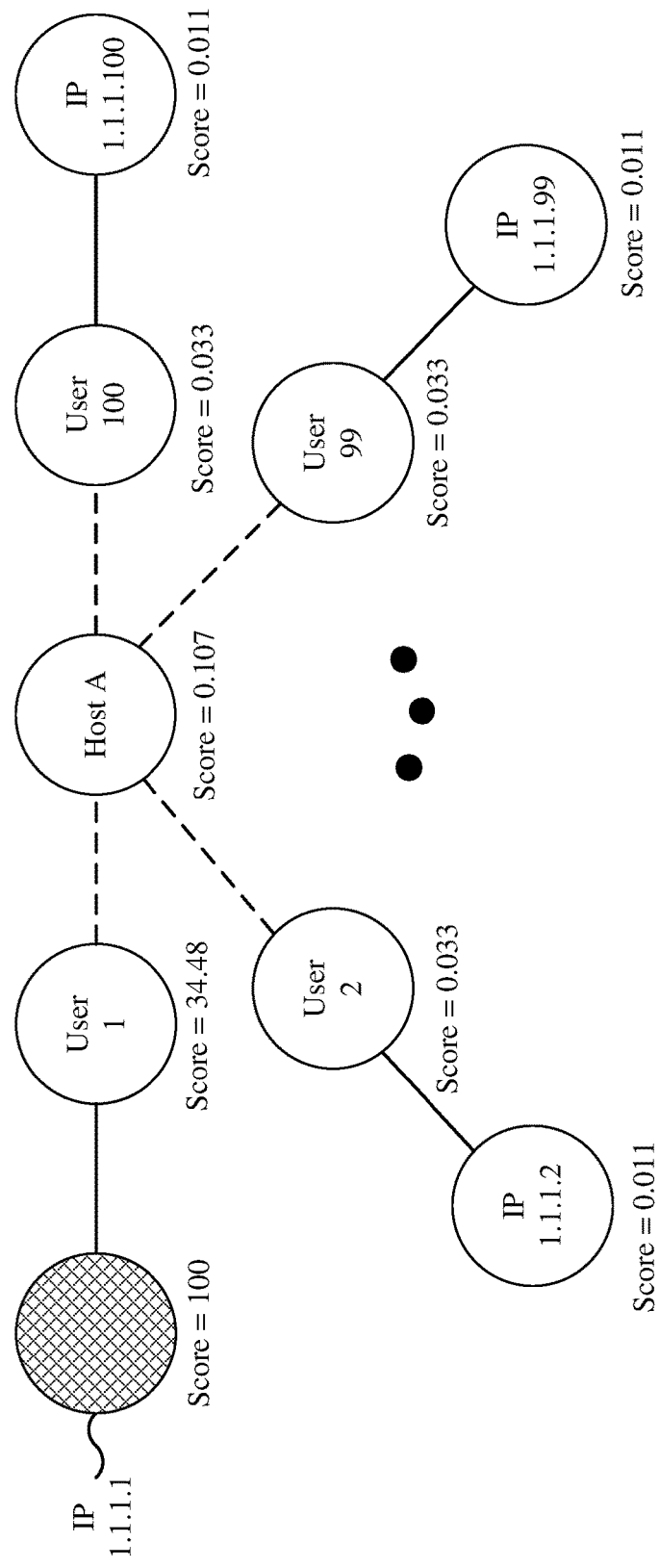
FIG. 9 presents propagated scores from a first starting node in the second example graph presented in FIG. 8.

In the following two figures, we illustrate propagated impact of native alert scores on connected, neighboring nodes when each of the two nodes with non-zero alert scores are selected as starting nodes one by one. FIG. 9 illustrates propagation of native alerts scores when the node representing IP 1.1.1.1 is selected as a starting node. Each iteration in the propagation is not shown separately as in the first example. The propagation of native alert score from IP 1.1.1.1 starts with the node representing user 1 getting a score of 34.48 in the first iteration. Following this, in the second iteration, the node representing host A gets a score of 0.107. Note that the propagation of alert scores from user 1 to host A is considerably attenuated because one hundred edges of the same connection type connect one hundred user nodes to host A. As user 1 is only one of a hundred user nodes connected to the node representing host A, its contribution to host A's propagated alert score is very low. In the next iteration, user 2, user 99, and user 100 gets propagated alert scores which are 0.033 each. In the last iteration, nodes representing IP 1.1.1.2, IP 1.1.1.99, and IP 1.1.1.100 get propagated scores of 0.011 each.

Figure 10:
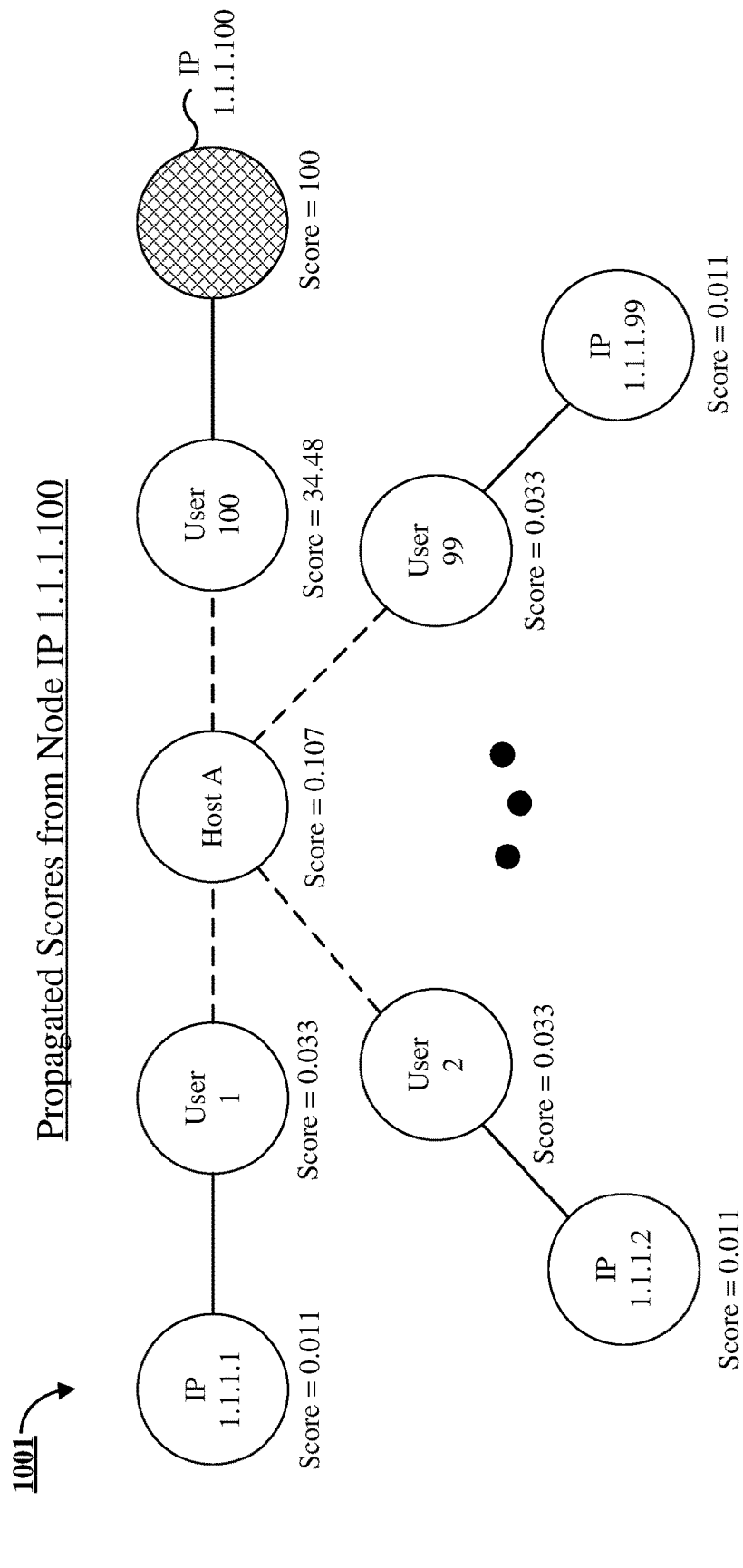
FIG. 10 presents propagated scores from a second starting node in the second example graph presented in FIG. 8.
Figure 11:
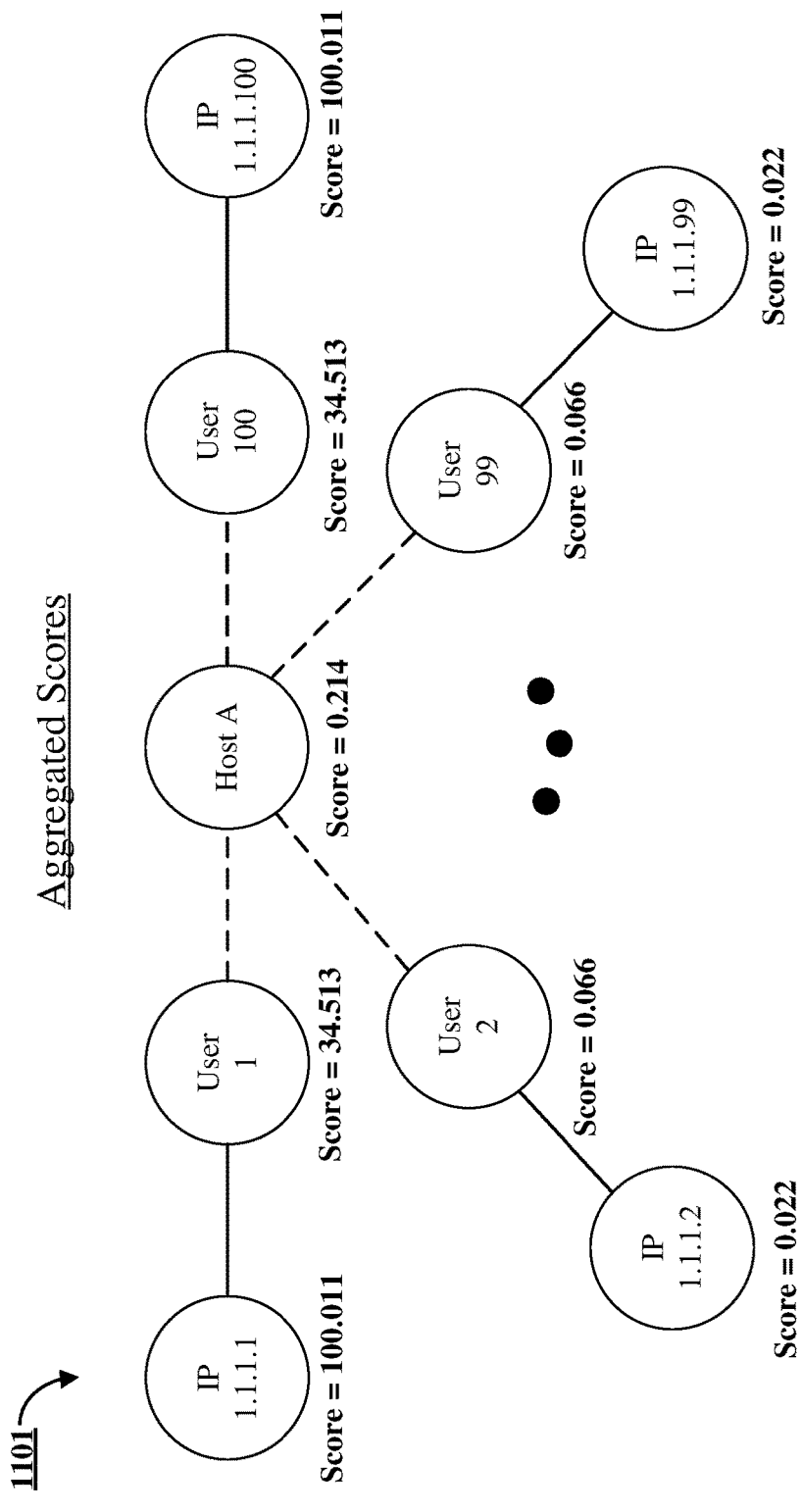
FIG. 11 presents aggregate scores for nodes in the second example graph presented in FIG. 8.

FIG. 10 presents a graph 1001 illustrating propagation of native alerts scores when the node representing IP 1.1.1.100 is selected as a starting node. In the first iteration, user 100 receives a propagated alert score of 34.48. In the second iteration, the host A receives a propagated alert score of 0.107. In the third iteration, user 1, user 2, and user 99 receive a propagated alert score of 0.033 each. Finally, in the fourth iteration, the nodes representing IP 1.1.1.1, IP 1.1.1.2, and IP 1.1.1.99 receive propagated alert scores of 0.011 each. FIG. 11 presents aggregate scores for each node in example 2 illustrated in a graph 1101. The aggregate scores for nodes are calculated by summing their respective native scores from FIG. 8 with propagated scores in FIGS. 9 and 10. The nodes representing IP 1.1.1.1 and IP 1.1.1.100 have highest aggregate scores of 100.011 each. Therefore, each one of these nodes is selected one by one to form clusters of connected nodes.

Figure 12:
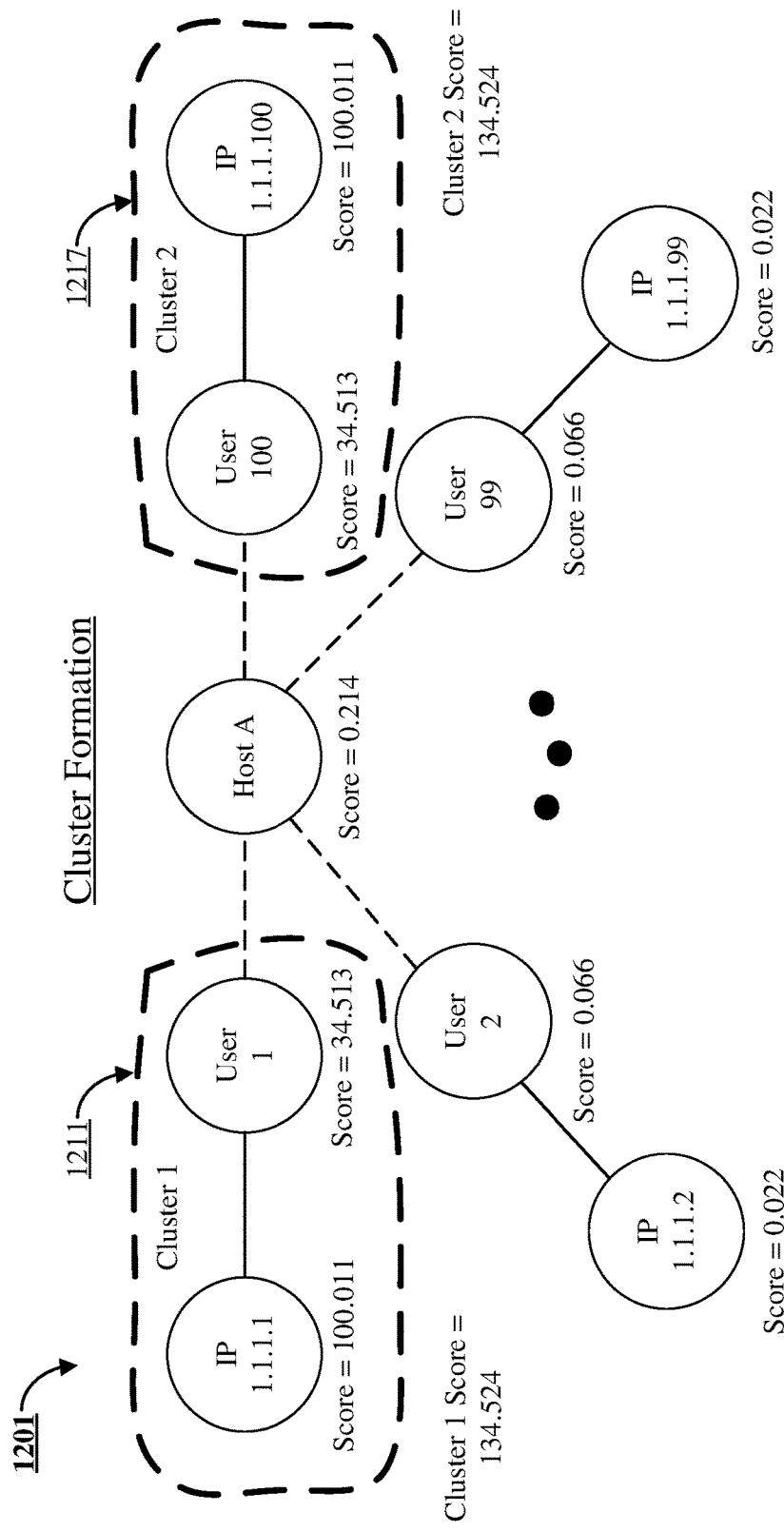
FIG. 12 presents cluster formation of connected nodes in the second example graph presented in FIG. 8.

Cluster formation is illustrated in a graph 1201 in FIG. 12. The cluster formation starts with selection of one of the two nodes having highest aggregate score. We start with the node representing IP 1.1.1.1 and compare the aggregate score of the connected node representing user 1 with a selected threshold. In this example, we compare a ratio of the aggregate scores in a pair of the connected nodes with a threshold. For a pair of connected nodes, if the aggregate score of one of the connected nodes is more than 10 times the aggregate score of the other node in the pair we break the chain and the nodes in the pair can be part of separate clusters. The ratio of the aggregate scores is calculated by dividing 100.11 by 34.513 which results in 2.89 which is less than 10 therefore, a cluster 1 is formed which includes the nodes representing IP 1.1.1.1 and user 1. In the next iteration, a ratio of aggregate scores of node representing user 1 and the node representing host A is calculated by dividing the aggregate score of user 1 (34.513) by aggregate score of host A (0.214), which results 161.27. As this is greater than 10, we break the chain. Therefore, cluster 1 is formed by including two nodes representing IP 1.1.1.1 and user 1. Following this, a similar sequence of steps is applied starting with node 1.1.1.100 which has an aggregate score of 100.011. This results in formation of cluster 2 including the nodes representing IP 1.1.1.100 and user 100. The two clusters are presented with respective boundaries 1211 and 1217 in the graph 1201. The scores of both clusters are 134.524 giving them equal rank. Both clusters are then presented to security analyst for further analysis.

The above examples illustrate that propagated score on a visited node depends on the strength of the relationship from the starting node and the number of edges of the same type connected with the visited node. The attenuation in the propagated score is greater if the relationship strength is weak and many edges of the same connection type are connected with the visited node. This attenuation is illustrated in the two examples above when propagating native score from user node to host node. As there are a hundred user nodes connected to the same host node, the host receives a very small amount of propagated score when traversal is from the user node to the host node.

Computer System

Figure 13:
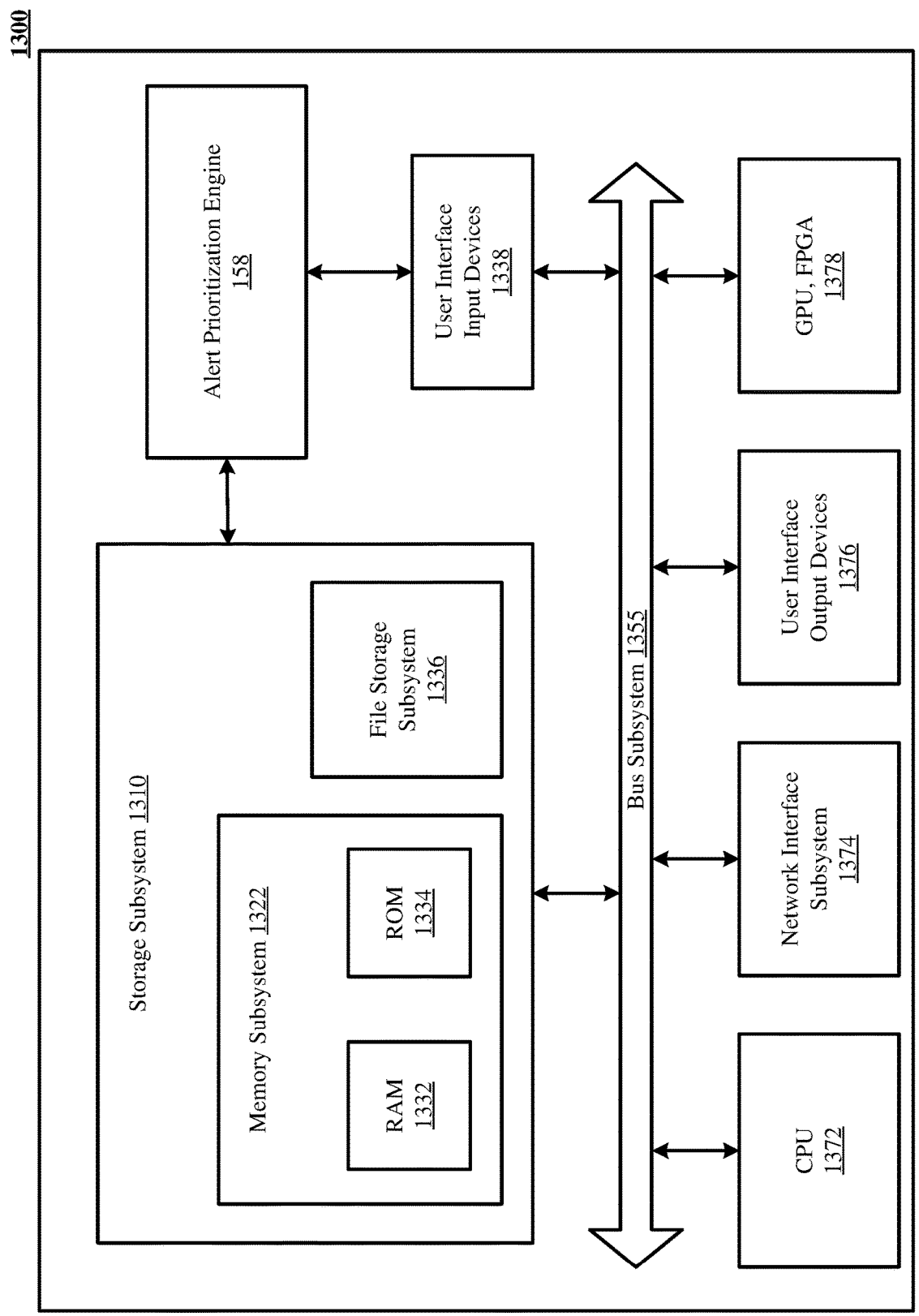
FIG. 13 is a simplified block diagram of a computer system that can be used to implement the technology disclosed.

FIG. 13 is a simplified block diagram of a computer system 1300 that can be used to implement alert prioritization engine 158 of FIG. 1 to group security alerts in generated in a computer network and prioritize grouped security alerts. Computer system 1300 includes at least one central processing unit (CPU) 1372 that communicates with a number of peripheral devices via bus subsystem 1355. These peripheral devices can include a storage subsystem 1310 including, for example, memory devices and a file storage subsystem 1336, user interface input devices 1338, user interface output devices 1376, and a network interface subsystem 1374. The input and output devices allow user interaction with computer system 1300. Network interface subsystem 1374 provides an interface to outside networks, including an interface to corresponding interface devices in other computer systems.

In one implementation, the alert prioritization engine 158 of FIG. 1 is communicably linked to the storage subsystem 1310 and the user interface input devices 1338.

User interface input devices 1338 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1376 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. Subsystem 1378 can be graphics processing units (GPUs) or field-programmable gate arrays (FPGAs).

Memory subsystem 1322 used in the storage subsystem 1310 can include a number of memories including a main random access memory (RAM) 1332 for storage of instructions and data during program execution and a read only memory (ROM) 1334 in which fixed instructions are stored. A file storage subsystem 1336 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 1310, or in other machines accessible by the processor.

Bus subsystem 1355 provides a mechanism for letting the various components and subsystems of computer system 1300 communicate with each other as intended. Although bus subsystem 1355 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1300 depicted in FIG. 13 is intended only as a specific example for purposes of illustrating the preferred embodiments of the present invention. Many other configurations of computer system 1300 are possible having more or less components than the computer system depicted in FIG. 13.

Particular Implementations

The technology disclosed relates to grouping security alerts generated in a computer network and prioritizing grouped security alerts for analysis.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to group security alerts generated from a computer network and prioritize grouped security alerts for analysis. The system graphs entities in the computer network as nodes connected by one or more edges. The system assigns a connection type to each edge. The connection type represents a relationship type between the nodes connected by the edge. The system assigns a weight to each edge representing a relationship strength between the nodes connected. The system assigns native scores from the security alerts to the nodes or to edges between the nodes. The system includes logic to traverse the graph, starting at the starting nodes with non-zero native scores, visiting the nodes in the graph and propagating the native scores from the starting nodes attenuated by the weights assigned to an edge traversed. The traversing extends for at least a predetermined span from the starting nodes, through and to neighboring nodes connected by the edges. The system normalizes and accumulates propagated scores at visited nodes, summed with the native score assigned to the visited nodes to generate aggregate scores for the visited nodes. The normalizing of the propagated scores at the visited nodes includes attenuating a propagated score based on a number of contributing neighboring nodes of a respective visited node to form a normalized score. The system forms clusters of connected nodes in the graph that have a respective aggregate score above a selected threshold. The clusters are separated from other clusters through nodes that have a respective aggregate score below the selected threshold. Finally, the system ranks and prioritizes clusters for analysis according to the aggregate scores of the nodes in the formed clusters.

The system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The nodes in the graph representing entities in the computer network can be connected by one or more directed edges. The nodes the graph can also be connected by directed and bi-directed or undirected edges.

The system includes logic to assign native alert scores for pending alerts to edges between the nodes. The system includes logic to distribute native alert scores from edges to nodes connected to the edges. The edges can include a loop edge connected to a single node. In this case, the system assigns the native alert score from a loop edge to the single node connected to the edge. The connection type assigned to edges can include an association connection type, a communication connection type, a failure connection type, a location connection type, and an action or an operation connection type.

When traversing the graph from the starting node to propagate native alert scores, the predetermined span is up to five edge or node hops from the starting node.

The system propagation of native scores from the starting nodes, through and to neighboring nodes connected by the edges is limited to when the propagated score is above a selected threshold and stops when the propagated score is below the selected threshold.

When normalizing the propagated score at the visited node, the system includes logic to attenuate the propagated score at the visited node in proportion to the number of neighboring nodes connected to the visited node by edges of the same connection type.

The system includes logic to attenuate the propagated score at the visited node by dividing the propagated score by a sum of weights of relationship strengths on edges connected to the visited node.

When forming clusters of connected nodes, the system includes logic to separate clusters by at least one node that has an aggregate score below a selected threshold. In another implementation, the system includes logic to separate clusters of connected nodes by at least one node in a pair of connected nodes that has an aggregate score less than ten times the aggregate score of the other node in the pair of connected nodes. In other implementations, higher values of the threshold can be used. For example, the system can include logic to separate clusters of connected nodes by at least one node in a pair of connected nodes that has an aggregate score less than fifteen times, twenty times or twenty five times the aggregate score of the other node in the pair of connected nodes. Similarly, in other implementations, lower values of threshold can be used. For example, the system can include logic to separate clusters of connected nodes by at least one node in a pair of connected nodes that has an aggregate score less than five times, three times or two times the aggregate score of the other node in the pair of connected nodes.

Other implementations may include a non-transitory computer readable storage medium storing instructions executable by a processor to perform functions of the system described above. Yet another implementation may include a method performing the functions of the system described above.

A method implementation of the technology disclosed includes graphing entities in the computer network as nodes connected by one or more edges. The method includes assigning a connection type to each edge. The connection type represents a relationship type between the nodes connected by the edge. The method includes, assigning a weight to each edge representing a relationship strength between the nodes connected. The method includes assigning native scores from the security alerts to the nodes or to edges between the nodes. The method includes traversing the graph, starting at the starting nodes with non-zero native scores, visiting the nodes in the graph and propagating the native scores from the starting nodes attenuated by the weights assigned to an edge traversed. The traversing extends for at least a predetermined span from the starting nodes, through and to neighboring nodes connected by the edges. The method includes normalizing and accumulating propagated scores at visited nodes, summed with the native score assigned to the visited nodes to generate aggregate scores for the visited nodes. The normalizing of the propagated scores at the visited nodes includes attenuating a propagated score based on a number of contributing neighboring nodes of a respective visited node to form a normalized score. The method includes forming clusters of connected nodes in the graph that have a respective aggregate score above a selected threshold. The clusters are separated from other clusters through nodes that have a respective aggregate score below the selected threshold. Finally, the method includes ranking and prioritizing clusters for analysis according to the aggregate scores of the nodes in the formed clusters.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

What is claimed is:

1. A computer-implemented method of grouping security alerts generated from a computer network and prioritizing grouped security alerts for analysis, including:

traversing a graph representing computer network entities as nodes and relationships between computer network entities as edges, and having starting nodes with non-zero native scores by visiting the nodes in the graph and propagating native scores from the starting nodes attenuated by a weight assigned to an edge traversed, the traversing extending for at least a predetermined span from the starting nodes, through and to neighboring nodes connected by the edges;

normalizing and accumulating propagated scores at visited nodes, summed with the native score assigned to the visited nodes to generate aggregate scores for the visited nodes, wherein normalizing the propagated scores at the visited nodes includes attenuating a propagated score based on a number of contributing neighboring nodes of a respective visited node to form a normalized score;

forming clusters of connected nodes in the graph that have a respective aggregate score above a selected threshold, which clusters are separated from other clusters through nodes that have a respective aggregate score below the selected threshold;

ranking and prioritizing for analysis, the clusters according to the aggregate scores of the nodes in the formed clusters; and facilitating accelerated investigation of the clusters in accordance with the ranking and prioritizing.

2. The method of claim 1, wherein the edges include one or more directed edges.

3. The method of claim 1, wherein the edges include directed and bi-directed edges.

4. The method of claim 1, further including assigning native scores for pending alerts to edges between the nodes.

5. The method of claim 4, further including distributing the assigned native scores from the edges to nodes connected to the edges.

6. The method of claim 5, wherein the edges include a loop edge connected to a single node, the method further including, assigning the native score of the loop edge to the single node.

7. The method of claim 1, wherein the connection type assigned to each edge includes at least one of an association connection type, a communication connection type, a failure connection type, a location connection type, and an action or an operation connection type.

8. The method of claim 1, wherein the predetermined span is up to five edge or node hops from the starting node.

9. The method of claim 1, wherein propagating native scores from the starting nodes, through and to neighboring nodes connected by the edges is limited to when the propagated score is above a selected threshold and stops when the propagated score is below the selected threshold.

10. The method of claim 1, wherein normalizing the propagated score at the visited node, further includes attenuating the propagated score at the visited node in proportion to the number of neighboring nodes connected to the visited node by edges of the same connection type.

11. The method of claim 1, further including, attenuating the propagated scores at the visited nodes by dividing the propagated scores by a sum of weights of relationship strengths on edges connected to the visited node.

12. The method of claim 1, wherein the clusters of connected nodes are separated by at least one node that has an aggregate score below a selected threshold.

13. The method of claim 1, wherein:
the clusters of connected nodes are separated by at least a pair of connected nodes;
an aggregate score ratio, the ratio including the aggregate score of the higher scoring node over the aggregate score of the lower scoring node, exceeds a ratio threshold; and
the ratio threshold falls in a range between two and twenty-five.

14. A system including one or more processors coupled to memory, the memory loaded with computer instructions to group security alerts generated from a computer network and prioritize grouped security alerts for analysis, the instructions, when executed on the processors, implement actions comprising:
traversing a graph, with nodes, representing computer network entities, connected by one or more edges, representing relationships between computer network entities, by starting at starting nodes with non-zero native scores, visiting the nodes in the graph and propagating native scores from the starting nodes attenuated by a weight assigned to an edge traversed, the traversing extending for at least a predetermined span from the starting nodes, through and to neighboring nodes connected by the edges;
normalizing and accumulating propagated scores at visited nodes, summed with the native score assigned to the visited nodes to generate aggregate scores for the visited nodes, wherein normalizing the propagated scores at the visited nodes includes attenuating a propagated score based on a number of contributing neighboring nodes of a respective visited node to form a normalized score;
forming clusters of connected nodes in the graph that have a respective aggregate score above a selected threshold, which clusters are separated from other clusters through nodes that have a respective aggregate score below the selected threshold;
ranking and prioritizing for analysis, the clusters according to the aggregate scores of the nodes in the formed clusters; and
facilitating accelerated investigation of the clusters in accordance with the ranking and prioritizing.

15. The system of claim 14, wherein the edges include one or more directed edges.

16. The system of claim 14, wherein the edges include directed and bi-directed edges.

17. The system of claim 14, further implementing actions comprising: assigning native scores for pending alerts to edges between the nodes.

18. A non-transitory computer readable storage medium impressed with computer program instructions to group security alerts generated from a computer network and prioritize grouped security alerts for analysis, the instructions, when executed on a processor, implement a method comprising:
traversing a graph, with nodes, representing computer network entities, connected by one or more edges, representing relationships between computer network entities, by starting at starting nodes with non-zero native scores, visiting the nodes in the graph and propagating native scores from the starting nodes attenuated by a weight assigned to an edge traversed, the traversing extending for at least a predetermined span from the starting nodes, through and to neighboring nodes connected by the edges;
normalizing and accumulating propagated scores at visited nodes, summed with the native score assigned to the visited nodes to generate aggregate scores for the visited nodes, wherein normalizing the propagated scores at the visited nodes includes attenuating a propagated score based on a number of contributing neighboring nodes of a respective visited node to form a normalized score;
forming clusters of connected nodes in the graph that have a respective aggregate score above a selected threshold, which clusters are separated from other clusters through nodes that have a respective aggregate score below the selected threshold;
ranking and prioritizing for analysis, the clusters according to the aggregate scores of the nodes in the formed clusters; and
facilitating accelerated investigation of the clusters in accordance with the ranking and prioritizing.

19. The non-transitory computer readable storage medium of claim 18, wherein the connection type assigned to each edge includes at least one of an association connection type, a communication connection type, a failure connection type, a location connection type, and an action or an operation connection type.

20. The non-transitory computer readable storage medium of claim 18, wherein propagating native scores from the starting nodes, through and to neighboring nodes connected by the edges is limited to when the propagated score is above a selected threshold and stops when the propagated score is below the selected threshold.

\* \* \* \* \*